United States Patent
Jeon et al.

(10) Patent No.: US 11,166,271 B2
(45) Date of Patent: Nov. 2, 2021

(54) DEVICE AND METHOD FOR FRONTHAUL TRANSMISSION IN WIRELESS COMMUNICATION SYSTEM

(71) Applicant: Samsung Electronics Co., Ltd., Suwon-si (KR)

(72) Inventors: Namryul Jeon, Suwon-si (KR); Daejoong Kim, Suwon-si (KR); Jaeyoel Kim, Suwon-si (KR); Wonwoo Rhim, Suwon-si (KR); Sunguk Huh, Suwon-si (KR)

(73) Assignee: Samsung Electronics Co., Ltd., Suwon-si (KR)

(\*) Notice: Subject to any disclaimer, the term of this patent is extended or adjusted under 35 U.S.C. 154(b) by 0 days.

(21) Appl. No.: 17/073,890

(22) Filed: Oct. 19, 2020

(65) Prior Publication Data
US 2021/0120531 A1 Apr. 22, 2021

(30) Foreign Application Priority Data
Oct. 18, 2019 (KR) .................. 10-2019-0130251

(51) Int. Cl.
*H04W 88/08* (2009.01)
*H04W 72/04* (2009.01)
*H04B 7/06* (2006.01)

(52) U.S. Cl.
CPC ........ *H04W 72/042* (2013.01); *H04B 7/0691* (2013.01); *H04W 72/046* (2013.01); *H04W 88/085* (2013.01)

(58) Field of Classification Search
CPC ... H04W 88/12; H04W 88/08; H04W 88/085; H04W 88/10
See application file for complete search history.

(56) References Cited

U.S. PATENT DOCUMENTS 10,080,215 B2 9/2018 Chen et al.
10,334,478 B2 6/2019 Boldi et al.
(Continued)

OTHER PUBLICATIONS

International Search Report and Written Opinion dated Feb. 15, 2021, issued in International Application No. PCT/KR2020/014252.
(Continued)

*Primary Examiner* — Kevin Kim
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to embodiments, a method performed by a distributed unit (DU), the method comprises generating a control plane (C-plane) message for multiple ports, the C-plane message including section information and a section extension; and transmitting the C-plane message to a radio unit (RU) via a specific port of the multiple ports. The section information includes information on a beam identifier (ID). The section extension includes beam group type information for indicating a type of beam grouping, and port information for indicating a total number of one or more extended antenna-carrier (eAxC) ports indicated by the section extension.

20 Claims, 14 Drawing Sheets

(56) References Cited

U.S. PATENT DOCUMENTS

| | | |
|---|---|---|
| 2017/0238361 A1 | 8/2017 | Pawar et al. |
| 2019/0245740 A1 | 8/2019 | Kachhla |
| 2019/0289497 A1 | 9/2019 | Rajagopal |
| 2019/0319742 A1 | 10/2019 | Wu et al. |
| 2021/0126760 A1* | 4/2021 | Lee ................... H04L 5/0005 |

OTHER PUBLICATIONS

Umesh, Anil. Overview of O-RAN Fronthaul Specifications. Radio Access Network Development Department. NTT DOCOMO Technical Journal vol. 21 No. 1 (Jul. 2019) pp. 46-59.

* cited by examiner

DEVICE AND METHOD FOR FRONTHAUL TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0130251, filed on Oct. 18, 2019, in the Korean Intellectual Property Office, the disclosure of which is incorporated by reference herein in its entirety.

BACKGROUND

1) Field

The disclosure relates to a wireless communication system. More particularly, the disclosure relates to a device and method for fronthaul transmission in a wireless communication system.

2) Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, beamforming, massive multiple-input multiple-output (MIMO), Full Dimensional MIMO (FD-MIMO), array antenna, analog beam forming, and large scale antenna techniques are discussed for use in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

As transmission capacity increases in a wireless communication system, a function split for functionally splitting a base station is applied. According to the function split, a base station may be split into a digital unit (DU) and a radio unit (RU), a fronthaul for communication between the DU and the RU is defined, and transmission via the fronthaul is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for transmitting a control message on a fronthaul interface.

Another aspect of the disclosure is to provide the device and method for integrating information common to layers in a single message and transmitting the information in a wireless communication system.

Another aspect of the disclosure is to provide the device and method for reducing a processing burden and a memory requirement when operating a digital unit (DU) and a radio unit (RU) in the wireless communication system.

Additional aspects will be set forth in part in the description which follows and, in part, will be apparent from the description, or may be learned by practice of the presented embodiments.

In accordance with an aspect of the disclosure, an operation method of a DU of a base station in a wireless communication system is provided. The method includes identifying a designated path among a plurality of paths of a fronthaul interface that connects the DU and an RU, generating a control message for a plurality of layers, and transmitting the control message to the RU via the designated path, wherein the control message includes scheduling information for the plurality of layers.

In accordance with another aspect of the disclosure, an operation method of an RU of a base station in a wireless communication system is provided. The method includes receiving a control message for a plurality of layers from a DU via a designated path among a plurality of paths of a fronthaul interface that connects the RU and the DU, identifying scheduling information for the plurality of layers based on the control message, and performing communication based on the scheduling information.

In accordance with another aspect of the disclosure, a device of a DU of a base station in a wireless communication system is provided. The device includes at least one processor, wherein the at least one processor identifies a designated path among a plurality of paths of a fronthaul interface that connects the DU and an RU, generates a control message for a plurality of layers, and controls the fronthaul interface to transmit the control message to the RU via the designated path, wherein the control message includes scheduling information for the plurality of layers.

In accordance with another aspect of the disclosure, a device of an RU of a base station in a wireless communication system is provided. The device includes at least one transceiver and at least one processor, wherein the at least one processor controls a fronthaul interface, which connects the RU and a DU, to receive a control message for a plurality of layers from the DU via a designated path among a plurality of paths of the fronthaul interface, identifies scheduling information for the plurality of layers based on the control message, and controls the at least one transceiver to perform communication based on the scheduling information.

According to embodiments, a method performed by a distributed unit (DU), the method comprises generating a control plane (C-plane) message for multiple ports, the C-plane message including section information and a section extension; and transmitting the C-plane message to a radio unit (RU) via a specific port of the multiple ports. The section information includes information on a beam identifier (ID). The section extension includes beam group type information for indicating a type of beam grouping, and port information for indicating a total number of one or more extended antenna-carrier (eAxC) ports indicated by the section extension.

According to embodiments, a method performed by a radio unit (RU), the method comprises: receiving, from a distributed unit (DU), a control plane (C-plane) message for multiple ports via a specific port of the multiple ports; identifying section information and a section extension included in the C-plane message. The section information includes information on a beam identifier (ID). The section extension includes beam group type information for indicating a type of beam grouping, and port information for indicating a total number of one or more extended antenna-carrier (eAxC) ports indicated by the section extension.

According to embodiments, a device of a distributed unit (DU), comprises at least one transceiver; and at least one processor configured to generate a control plane (C-plane) message for multiple ports, the C-plane message including section information and a section extension; and control the at least one transceiver to transmit the C-plane message to a radio unit (RU) via a specific port of the multiple ports. The section information includes information on a beam identifier (ID). The section extension includes beam group type information for indicating a type of beam grouping, and port information for indicating a total number of one or more extended antenna-carrier (eAxC) ports indicated by the section extension.

According to embodiments, a device of a radio unit (RU), comprises at least one transceiver; and at least one processor configured to control the at least one transceiver to receive, from a distributed unit (DU), a control plane (C-plane) message for multiple ports via a specific port of the multiple ports; identify section information and a section extension included in the C-plane message including. The section information includes information on a beam identifier (ID). The section extension includes beam group type information for indicating a type of beam grouping, and port information for indicating a total number of one or more extended antenna-carrier (eAxC) ports indicated by the section extension.

A device and method according to various embodiments reduces the operational burden of a DU and an RU by transmitting information on each layer via a single control message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
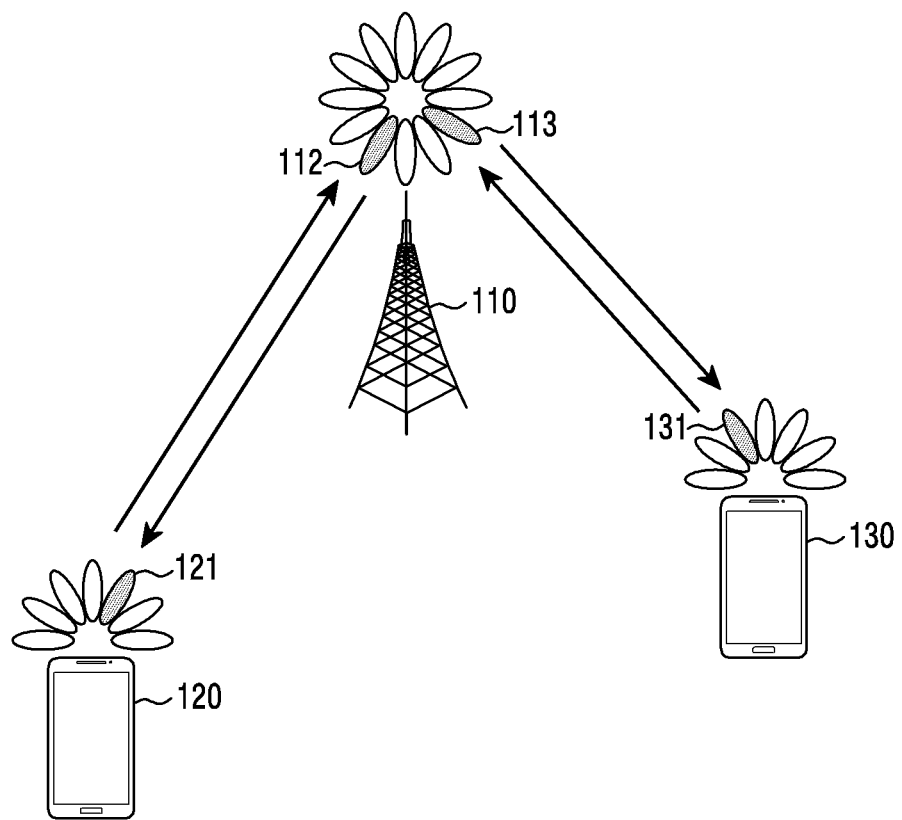
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the following description, terms (e.g., message, information, preamble, signal, signaling, sequence, and stream) referring to a signal, terms (e.g., symbol, slot, subframe, radio frame, subcarrier, resource element (RE), resource block (RB), bandwidth part (BWP), and occasion) referring to a resource, terms (e.g., operation or procedure) referring to an operation state, terms (e.g., user stream, IQ data, information, bit, symbol, and codeword) referring to data, terms referring to a channel, terms (e.g., downlink control information (DCI), medium access control (MAC) control element (CE), and radio resource control (RRC) signaling) referring to control information, terms referring to network entities, terms referring to elements of a device, etc. are illustrated for the convenience of description. Therefore, the disclosure is not limited to the terms described below, and other terms having equivalent technical meanings may be used.

In the disclosure, in order to determine whether a specific condition is satisfied or fulfilled, an expression of more/greater/larger than or less/smaller than may be used, but this is only a description for expressing an example, and does not exclude a description of equal to or more/greater/larger than or a description of equal to or less/smaller than. The condition described as "equal to or more/greater/larger than" may be replaced with "more/greater/larger than," the condition described as "equal to or less/smaller than" may be replaced with "less/smaller than," and the condition described as "equal to or more/greater/larger than, and less/smaller than" may be replaced with "more/greater/larger than, and equal to or less/smaller than."

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

FIG. 1A illustrates a wireless communication system according to an embodiment of the disclosure. FIG. 1 illustrates a base station 110, a terminal 120, and a terminal 130, as parts of nodes using a radio channel in a wireless communication system. FIG. 1 illustrates only one base station, but may further include another base station that is the same as or similar to the base station 110.

Referring to FIG. 1A, the base station 110 is a network infrastructure that provides wireless access to the terminals 120 and 130. The base station 110 has coverage defined to be a predetermined geographic area based on the distance over which a signal may be transmitted. The base station 110 may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

Each of the terminal 120 and the terminal 130 is a device used by a user, and performs communication with the base station 110 via the radio channel. A link from the base station 110 to the terminal 120 or the terminal 130 is referred to as a downlink (DL), and a link from the terminal 120 or the terminal 130 to the base station 110 is referred to as an uplink (UL). The terminal 120 and the terminal 130 may communicate with each other via a radio channel. In this case, a device-to-device (D2D) link between the terminal 120 and the terminal 130 is referred to as a sidelink, and the sidelink may be interchangeably used with a PC5 interface. In some cases, at least one of the terminal 120 and the terminal 130 may be operated without involvement of a user. That is, at least one of the terminal 120 and the terminal 130 is a device that performs machine type communication (MTC) and may not be carried by a user. Each of the terminal 120 and the terminal 130 may be referred to as, in addition to "terminal," "user equipment (UE)," "customer premises equipment (CPE)," "mobile station," "subscriber station," "remote terminal," "wireless terminal," "electronic device," "user device," or other terms having equivalent technical meanings.

The base station 110, the terminal 120, and the terminal 130 may perform beamforming. The base station 110, the terminal 120, and the terminal 130 may transmit and receive radio signals in a relatively low frequency band (e.g., frequency range 1 (FR1) of new radio (NR)) as well as a high frequency band (e.g., FR2 of NR, and a millimeter wave (mmWave) band (e.g., 28 gigahertz (GHz), 30 GHz, 38 GHz, and 60 GHz)). At this time, in order to improve a channel gain, the base station 110, the terminal 120, and the terminal 130 may perform beamforming. The beamforming may include transmission beamforming and reception beamforming. That is, the base station 110, the terminal 120, and the terminal 130 may assign a directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationship with resources at which the serving beams 112, 113, 121, and 131 are transmitted. The base station/terminal according to various embodiments may perform communication also within a frequency range corresponding to FR1. The base station/terminal may or may not perform beamforming.

If large-scale characteristics of a channel, via which a symbol on a first antenna port has been transferred, can be inferred from a channel via which a symbol on a second antenna port has been transferred, it may be estimated that the first antenna port and the second antenna port are in a QCL relationship. For example, the large-scale characteristics may include at least one among a delay spread, a doppler spread, a doppler shift, an average gain, an average delay, and a spatial receiver parameter.

In the disclosure, a beam refers to a spatial flow of a signal in a radio channel, and is formed by one or more antennas (or antenna elements), and this forming procedure may be referred to as beamforming. Beamforming may include analog beamforming and digital beamforming (e.g., precoding). A reference signal transmitted based on beamforming may be, for example, a demodulation-reference signal (DM-RS), a channel state information-reference signal (CSI-RS), a synchronization signal/physical broadcast channel (SS/PBCH), and a sounding reference signal (SRS). As a configuration for each reference signal, an IE, such as a CSI-RS resource or an SRS-resource, may be used, and this configuration may include information associated with a beam. The information associated with a beam may indicate whether the configuration (e.g., CSI-RS resource) uses the same spatial domain filter as that of the other configuration (e.g., another CSI-RS resource in the same CSI-RS resource set) or uses a different spatial domain filter, or may indicate a reference signal, with which the configuration is quasi-co-located (QCL), and a type (e.g., QCL type A, B, C, D) of the QCL if the configuration is quasi-co-located.

When storing a beam profile during an RU initialization procedure, the base station may store a common beam vector and each precoding vector in order of each layer. Considering of each of all terminals (i.e., users) as one layer and applying a common weight vector (precoder) to each terminal may be understood as forming a common beam applied to all terminals. Applying a specific precoder for a multi-layer to each terminal may be understood as single-user beamforming for each terminal. Even if the precoder is applied to the terminals, signals transmitted to some terminals may be spatially distinguished from signals transmitted to some other terminals. In this case, applying of the corresponding precoder may be understood as multi-user beamforming.

Conventionally, in a communication system in which a cell radius of a base station is relatively large, each base station is installed so that each base station includes a function of a digital processing unit (or DU) and a function of a radio frequency (RF) processing unit (RU). However, when a high frequency band is used in a communication system of 4th generation (4G) and/or later, and as the cell radius of a base station decreases, the number of base stations for covering a specific area has increased, and the burden of installation costs of the operator for installation of the increased base stations has increased. In order to minimize an installation cost of a base station, a structure has been proposed in which a DU and RUs of the base station are separated so that one or more RUs are connected to one DU via a wired network, and one or more RUs distributed geographically are deployed to cover a specific area. Hereinafter, a deployment structure and extension examples of the base station according to various embodiments will be described via FIG. 1B.

Figure 1B:
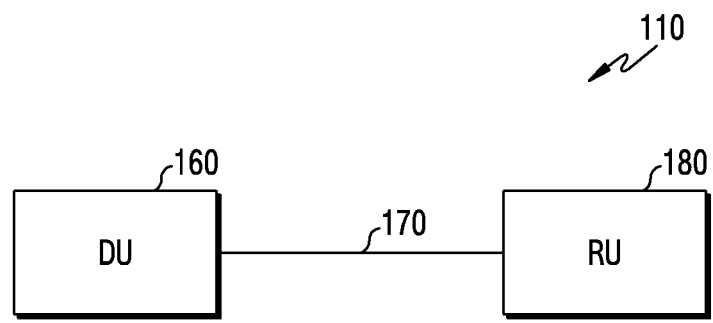
FIG. 1B illustrates an example of a fronthaul structure according to a function split of the base station according to an embodiment of the disclosure.

FIG. 1B illustrates an example of a fronthaul structure according to a function split of the base station according to an embodiment of the disclosure. Unlike a backhaul between a base station and a core network, a fronthaul is located between entities between a WLAN and a base station.

Referring to FIG. 1B, the base station 110 may include a DU 160 and an RU 180. A fronthaul 170 between the DU 160 and the RU 180 may be operated via an $F_x$ interface. For the operation of the fronthaul 170, for example, an interface, such as an enhanced common public radio interface (eCPRI) and radio over Ethernet (ROE), may be used.

With the development of communication technology, mobile data traffic increases, and accordingly, the amount of bandwidth required in a fronthaul between a digital unit and a radio unit has greatly increased. In an arrangement, such as a centralized/cloud radio access network (C-RAN), the DU may be implemented to perform functions for a packet data convergence protocol (PDCP), a radio link control (RLC), a media access control (MAC), and a physical (PHY) layer, and the RU may be implemented to perform more functions for a PHY layer in addition to a radio frequency (RF) function.

The DU 160 may be in charge of an upper layer function of a radio network. For example, the DU 160 may perform a function of a MAC layer and a part of a PHY layer. Here, a part of the PHY layer is a function performed at a higher stage from among functions of the PHY layer, and may include, for example, channel encoding (or channel decoding), scrambling (or descrambling), modulation (or demodulation), and layer mapping (or layer demapping). According to an embodiment, if the DU 160 conforms to the O-RAN standard, it may be referred to as an O-RAN DU (O-DU). The DU 160 may be replaced with and represented by a first network entity for the base station (e.g., a next generation base station (gNB)) in embodiments of the disclosure as needed.

The RU 180 may be in charge of a lower layer function of the radio network. For example, the RU 180 may perform a part of the PHY layer and the RF function. Here, a part of the PHY layer is a function performed at a relatively lower stage compared to the DU 160 from among the functions of the PHY layer, and may include, for example, an inverse fast Fourier transform (FFT) (IFFT) transformation (or FFT transformation), cyclic prefix (CP) insertion (CP removal), and digital beamforming. An example of such a specific function split is described in detail in FIG. 4. The RU 180 may be referred to as "access unit (AU)," "access point (AP)," "transmission/reception point (TRP)," "remote radio head (RRH)," "radio unit (RU)" or another term having an equivalent technical meaning. According to an embodiment, if the RU 180 conforms to the O-RAN standard, it may be referred to as an O-RAN RU (O-RU). The RU 180 may be replaced with and represented by a second network entity for the base station (e.g., gNB) in embodiments of the disclosure as needed.

FIG. 1B shows that the base station includes the DU and the RU, but various embodiments are not limited thereto. In some embodiments, the base station may be implemented to have distributed deployment according to a centralized unit (CU) configured to perform a function of an upper layer (e.g., packet data convergence protocol (PDCP) and RRC) of an access network and a distributed unit (DU) configured to perform a function of a lower layer. The distributed unit (DU) may include the digital unit (DU) and the radio unit (RU) of FIG. 1. Between the core (e.g., 5G core (5GC) or next generation core (NGC)) network and the radio network (RAN), the base station may be implemented in a structure with deployment in the order of the CU, the DU, and the RU. An interface between the CU and the distributed unit (DU) may be referred to as an F1 interface.

The centralized unit (CU) may be connected to one or more DUs so as to be in charge of a function of a layer higher than that of the DUs. For example, the CU may be in charge of functions of radio resource control (RRC) and packet data convergence protocol (PDCP) layers, and the DU and the RU may be in charge of a function of a lower layer. The DU may perform some functions of the physical (PHY) layer, the media access control (MAC), and the radio link control (RLC), and the RU may be in charge of the remaining functions (low PHY) of the PHY layer. For example, the digital unit (DU) may be included in a distributed unit (DU) according to distributed deployment implementation of the base station. Hereinafter, unless otherwise defined, descriptions are provided with operations of a digital unit (DU) and a RU. However, various embodiments may be applied to both base station deployment including a CU or deployment in which a DU is directly connected to a core network without a CU (i.e., a CU and a DU are integrated and implemented into one entity).

Figure 2:
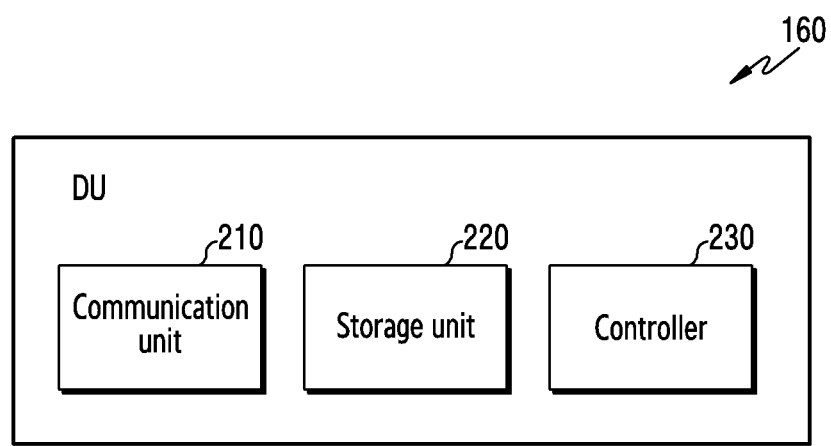
FIG. 2 illustrates a configuration of a digital unit (DU) in the wireless communication system according to an embodiment of the disclosure.

FIG. 2 illustrates a configuration of a DU in the wireless communication system according to an embodiment of the disclosure. The configuration illustrated in FIG. 2 may be understood as the configuration of the DU 160 of FIG. 1B, as part of a base station. The terms "-unit," "-device," etc. used hereinafter refer to a unit that processes at least one function or operation, which may be implemented by hardware or software, or a combination of hardware and software.

Referring to FIG. 2, the DU 160 includes a communication unit 210, a storage unit 220, and a controller 230.

The communication unit 210 may perform functions for transmitting or receiving a signal in a wired communication environment. The communication unit 210 may include a wired interface for controlling a direct connection between devices via a transmission medium (e.g., copper wire and optical fiber). For example, the communication unit 210 may transfer an electrical signal to another device through a copper wire, or may perform conversion between an electrical signal and an optical signal. The communication unit 210 may be connected to the radio unit (RU). The communication unit 210 may be connected to the core network or may be connected to the CU in distributed deployment.

The communication unit 210 may perform functions for transmitting or receiving a signal in a wired communication environment. For example, the communication unit 210 may perform conversion between a baseband signal and a bit stream according to the physical layer specification of a system. For example, when transmitting data, the communication unit 210 generates complex symbols by encoding and modulating a transmission bit stream. When receiving data, the communication unit 210 reconstructs a received bit stream by demodulating and decoding the baseband signal. Also, the communication unit 210 may include a plurality of transmission/reception paths. According to an embodiment, the communication unit 210 may be connected to the core network or may be connected to other nodes (e.g., integrated access backhaul (IAB)).

The communication unit 210 may transmit or receive a signal. To this end, the communication unit 210 may include at least one transceiver. For example, the communication unit 210 may transmit a synchronization signal, a reference signal, system information, a message, a control message, a stream, control information, data, or the like. The communication unit 210 may perform beamforming.

The communication unit 210 transmits and receives a signal as described above. Accordingly, all or a part of the communication unit 210 may be referred to as "transmitter," "receiver," or "transceiver." In the following description, transmission and reception performed via a radio channel are used in a sense including processing performed as described above by the communication unit 210.

Although not illustrated in FIG. 2, the communication unit 210 may further include a backhaul communication unit for connecting to the core network or another base station. The backhaul communication unit provides an interface to perform communication with other nodes within the network. That is, the backhaul communication unit converts, into a physical signal, a bit stream transmitted from the base station to another node, for example, another access node, another base station, an upper node, the core network, etc., and converts a physical signal received from another node into a bit stream.

The storage unit 220 stores data, such as a basic program, an application program, and configuration information for operations of the DU 160. The storage unit 220 may include a memory. The storage unit 220 may include a volatile memory, a nonvolatile memory, or a combination of a volatile memory and a nonvolatile memory. The storage unit 220 provides stored data in response to a request of the controller 230. According to an embodiment, the storage unit 220 may store scheduling information (e.g., beam information and antenna port information) and flow information (e.g., eAxC) for each stream.

The controller 230 may control overall operations of the DU 160. For example, the controller 230 transmits and receives a signal via the communication unit 210 (or backhaul communication unit). Further, the controller 230 records and reads data in the storage unit 220. The controller 230 may perform functions of a protocol stack required by the communication standard. To this end, the controller 230 may include at least one processor. In some embodiments, the controller 230 may include a control message generator including resource allocation information for scheduling multiple layers, and a flow identifier for transmission of a corresponding control message. The control message generator and the flow identifier are instruction sets or codes stored in the storage unit 230, and may be instructions/codes at least temporarily residing in the controller 230 or a storage space storing instructions/codes, or may be a part of a circuitry constituting the controller 230. According to various embodiments, the controller 230 may control the DU 160 to perform operations based on the various embodiments described below.

The configuration of the DU 160 illustrated in FIG. 2 is merely an example, and an example of the DU performing various embodiments of the disclosure is not limited from the configuration illustrated in FIG. 2. That is, according to various embodiments, some elements may be added, deleted, or changed.

Figure 3:
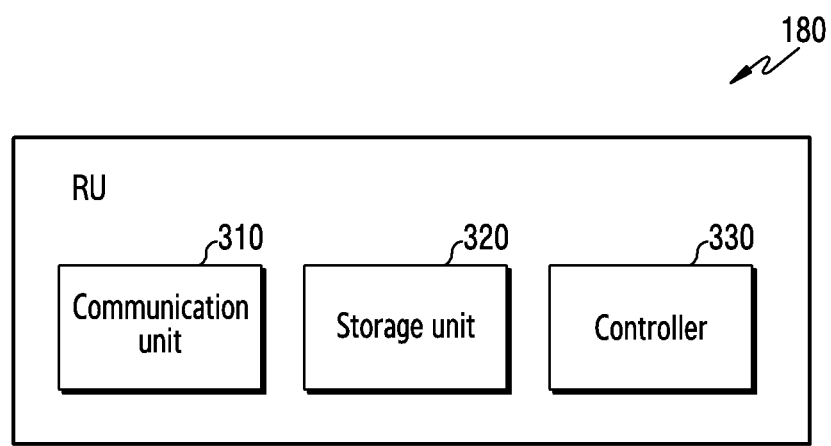
FIG. 3 illustrates a configuration of a radio unit (RU) in the wireless communication system according to an embodiment of the disclosure.

FIG. 3 illustrates a configuration of an RU in the wireless communication system according to an embodiment of the disclosure. The configuration illustrated in FIG. 3 may be understood as the configuration of the RU 180 of FIG. 1B, as part of the base station. The terms "-unit," "-device," etc. used hereinafter refer to a unit that processes at least one function or operation, which may be implemented by hardware or software, or a combination of hardware and software.

Referring to FIG. 3, the RU 180 includes a communication unit 310, a storage unit 320, and a controller 330.

The communication unit 310 performs functions for transmitting or receiving a signal via a radio channel. For example, the communication unit 310 up-converts a baseband signal into an RF band signal, transmits the up-converted RF band signal via an antenna, and then down-converts the RF band signal received via the antenna into a baseband signal. For example, the communication unit 310 may include a transmission filter, a reception filter, an amplifier, a mixer, an oscillator, a DAC, an ADC, and the like.

Also, the communication unit 310 may include a plurality of transmission/reception paths. Further, the communication unit 310 may include an antenna unit. The communication unit 310 may include at least one antenna array including multiple antenna elements. In terms of hardware, the communication unit 310 may include a digital circuit and an analog circuit (e.g., radio frequency integrated circuit (RFIC)). The digital circuit and the analog circuit may be implemented in a single package. The communication unit 310 may include a plurality of RF chains. The communication unit 310 may perform beamforming. In order to give directivity according to a configuration of the controller 330 to a signal to be transmitted or received, the communication unit 310 may apply a beamforming weight to the signal. According to an embodiment, the communication unit 310 may include a radio frequency (RF) block (or RF unit).

The communication unit 310 may transmit or receive a signal. To this end, the communication unit 310 may include at least one transceiver. The communication unit 310 may transmit a downlink signal. The downlink signal may include a synchronization signal (SS), a reference signal (RS) (e.g., cell-specific reference signal (CRS) and a demodulation (DM)-RS), system information (e.g., MIB, SIB, remaining system information (RMSI), and other system information (OSI)), a configuration message, control information, downlink data, or the like. The communication unit 310 may receive an uplink signal. The uplink signal may include a random access-related signal (e.g., a random access preamble (RAP) (or message 1 (Msg1) and message 3 (Msg3)) or a reference signal (e.g., a sounding reference signal (SRS), and a DM-RS), a power headroom report (PHR), or the like.

The communication unit 310 transmits and receives a signal as described above. Accordingly, all or a part of the communication unit 310 may be referred to as "transmitter," "receiver," or "transceiver." In the following description, transmission and reception performed via a wireless channel are used in a sense including processing performed as described above by the wireless communication unit 310.

The storage unit 320 stores data, such as a basic program, an application program, and configuration information for operations of the RU 180. The storage unit 320 may include a volatile memory, a nonvolatile memory, or a combination of a volatile memory and a nonvolatile memory. The storage unit 320 provides stored data in response to a request of the controller 330.

The controller 330 controls overall operations of the RU 180. For example, the controller 330 transmits and receives a signal via the communication unit 310. The controller 330 records and reads data in the storage unit 320. The controller 330 may perform functions of a protocol stack required by the communication standard. To this end, the controller 330 may include at least one processor. The controller 330 may include various modules for performing communication. According to various embodiments, the controller 330 may control a terminal to perform operations based on various embodiments described below.

Figure 4:
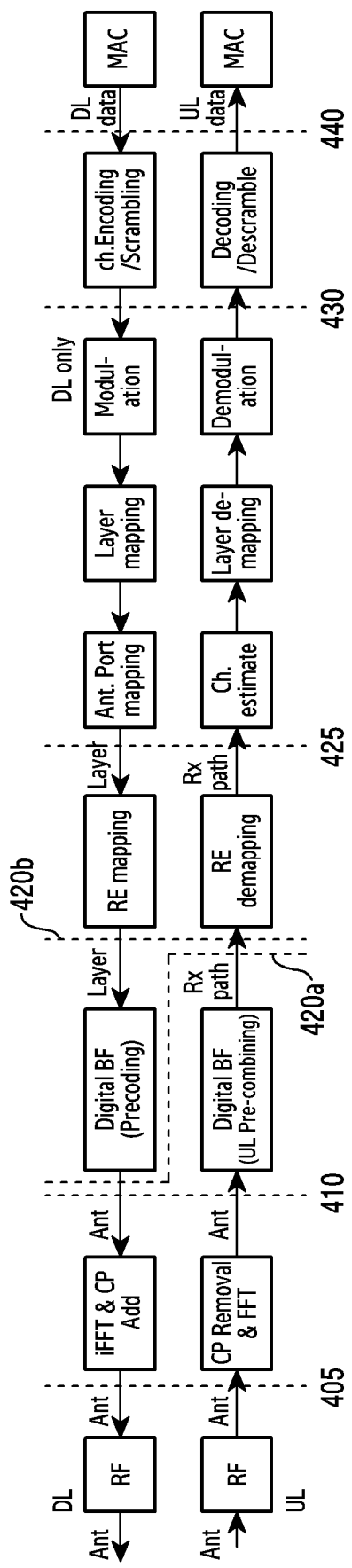
FIG. 4 illustrates an example of a function split in the wireless communication system according to an embodiment of the disclosure.

FIG. 4 illustrates an example of a function split in the wireless communication system according to an embodiment of the disclosure. With the advancement of wireless communication technology (e.g., 5th generation communication system (or the introduction of new radio (NR) communication system)), a use frequency band has increased more and more, and as a cell radius of a base station becomes very small, the number of RUs required to be installed has further increased. In a 5G communication system, the amount of transmitted data has increased by 10 times or more, and the transmission capacity of a wired network, which is transmitted via a fronthaul, has increased significantly. Due to these factors, the installation cost of a wired network in a 5G communication system may increase significantly. Therefore, in order to lower the transmission capacity of the wired network and reduce the installation cost of the wired network, techniques for lowering the transmission capacity of the fronthaul by transferring some functions of a modem of a DU to a RU have been proposed, and these techniques may be referred to as "function split."

In order to reduce the burden on the DU, a method of extending a role of the RU, which is in charge of only an RF function, to some functions of a physical layer is considered. In this case, as the RU performs functions of a higher layer, the throughput of the RU increases, so that a transmission bandwidth in the fronthaul may increase, while delay time requirement constraint due to response processing decreases. As the RU performs the functions of a higher layer, the virtualization gain decreases and the size/weight/cost of the RU increases. In consideration of the trade-off of the advantages and disadvantages described above, it is required to implement an optimal function split.

Referring to FIG. 4, function splits in a physical layer below a MAC layer are shown. In the case of a downlink (DL) that transmits a signal to a terminal via the radio network, the base station may sequentially perform channel encoding/scrambling, modulation, layer mapping, antenna mapping, RE mapping, digital beamforming (e.g., precoding), IFFT transform/CP insertion, and RF conversion. In the case of an uplink (UL) that receives a signal from a terminal via the radio network, the base station may sequentially perform RF conversion, FFT transform/CP removal, digital beamforming (pre-combining), RE demapping, channel estimation, layer demapping, demodulation, and decoding/descrambling. Separation of uplink functions and downlink functions may be defined in various types by the necessity between vendors, discussion on specifications, etc. according to the trade-off described above.

A first function split 405 may be separation of an RF function and a PHY function. The first function split is that the PHY function in the RU is not substantially implemented, and may be referred to as, for example, option 8. A second function split 410 enables the RU to perform the PHY function that is to perform IFFT transform/CP insertion in the DL and FFT transform/CP removal in the UL, and enables the DU to perform the remaining PHY functions. For example, the second function split 410 may be referred to as option 7-1. A third function split 420*a* enables the RU to perform the PHY function that is to perform IFFT transform/CP insertion in the DL and FFT transform/CP removal and digital beamforming in the UL, and enables the DU to perform the remaining PHY functions. For example, the third function split 420*a* may be referred to as option 7-2x category A. A fourth function split 420*b* enables the RU to perform up to digital beamforming in both the DL and UL, and enables the DU to perform higher PHY functions after the digital beamforming. For example, the fourth function split 420*b* may be referred to as option 7-2x category B. A fifth function split 425 enables the RU to perform up to RE mapping (or RE demapping) in both the DL and UL, and enables the DU to perform higher PHY functions after the RE mapping (or RE demapping). For example, the fifth function split 425 may be referred to as option 7-2. A sixth function split 430 enables the RU to perform up to modulation (or demodulation) in both the DL and UL, and enables the DU to perform higher PHY functions after the modulation (or demodulation). For example, the sixth function split 430 may be referred to as option 7-3. A seventh function split 440 enables the RU to perform up to encoding/scrambling (or decoding/descrambling) in both the DL and UL, and enables the DU to perform higher PHY functions after the modulation (or demodulation). For example, the seventh function split 440 may be referred to as option 6.

According to an embodiment, when large-capacity signal processing is expected, such as the FR1 MMU, a function split (e.g., the fourth function split 420*b*) at a relatively high layer may be required to reduce a fronthaul capacity. In a function split (e.g., the sixth function split 430) at a layer that is too high, a control interface becomes complex, and the burden on the implementation of the RU may be caused due to a plurality of PHY processing blocks included in the RU, so that an appropriate function split may be required according to a deployment and implementation scheme for the DU and the RU.

According to an embodiment, if precoding of data received from the DU is unable to be processed (i.e., if there is a limit to the precoding capability of the RU), the third function split 420*a* or a lower function split (e.g., the second function split 410) may be applied. Conversely, if there is an ability to process the precoding of data received from the DU, the fourth function split 420*b* or a higher function split (e.g., the sixth function split 430) may be applied. Hereinafter, various embodiments are described based on the third function split 420a or the fourth function split 420b unless otherwise limited, but configurations of the embodiments via other function splits are not excluded. That is, in a situation of the sixth function split 430 (option 7-3), operations of the DU and RU for control message transmission in FIG. 5 to FIG. 12 described below may be applied.

Fronthaul Control Message for Multi-Layer Scheduling

In order to increase intra-cell transmission capacity, a base station may perform multi-layer transmission to a terminal. The base station may generate a plurality of streams and may transmit the streams to the terminal within one TTI. Each stream may be transmitted via an antenna corresponding to the corresponding stream. Each transmission stream is spatially divided via the antenna. In this case, as the number of layers increases, the throughput required by the base station in a fronthaul between a DU and an RU increases. This problem may occur in a case of an uplink in which the terminal transmits data to the base station, as well as in a case in which the base station transmits data to the terminal. Accordingly, in FIG. 5 to FIG. 12, a scheme for transmitting control information (e.g., resource allocation information, beam allocation information, scheduling information, etc.) more efficiently during multi-layer scheduling in a fronthaul structure according to a function split between the DU and the RU is described.

For describing Section type, the following section types are supported within the C-Plane.

| Section Type | Target Scenario | Remarks |
| --- | --- | --- |
| 0 | Unused Resource Blocks or symbols in Downlink or Uplink | Indicates to O-RU that certain Resource Blocks or symbols will not be used (idle periods, guard periods). Likewise, there are no associated U-Plane messages containing IQ data for this Section Type. |
| 1 | Most DL/UL radio channels | Here "most" refers to channels not requiring time or frequency offsets such as are needed for mixed-numerology channels |
| 2 | reserved for future use | |
| 3 | PRACH and mixed-numerology channels | Channels requiring time or frequency offsets or different-than-nominal SCS values |
| 4 | Reserved for further use | |
| 5 | UE scheduling information (UE-ID assignment to section) | Provides scheduling information for UE-IDs |
| 6 | Channel information | Sends UE-specific channel information from the O-DU to the O-RU |
| 7 | LAA | Messages communicated between O-DU and the O-RU in both directions to configure LBT for PDSCH/DRS transmission and to report the LBT outcome. |

Figure 5:
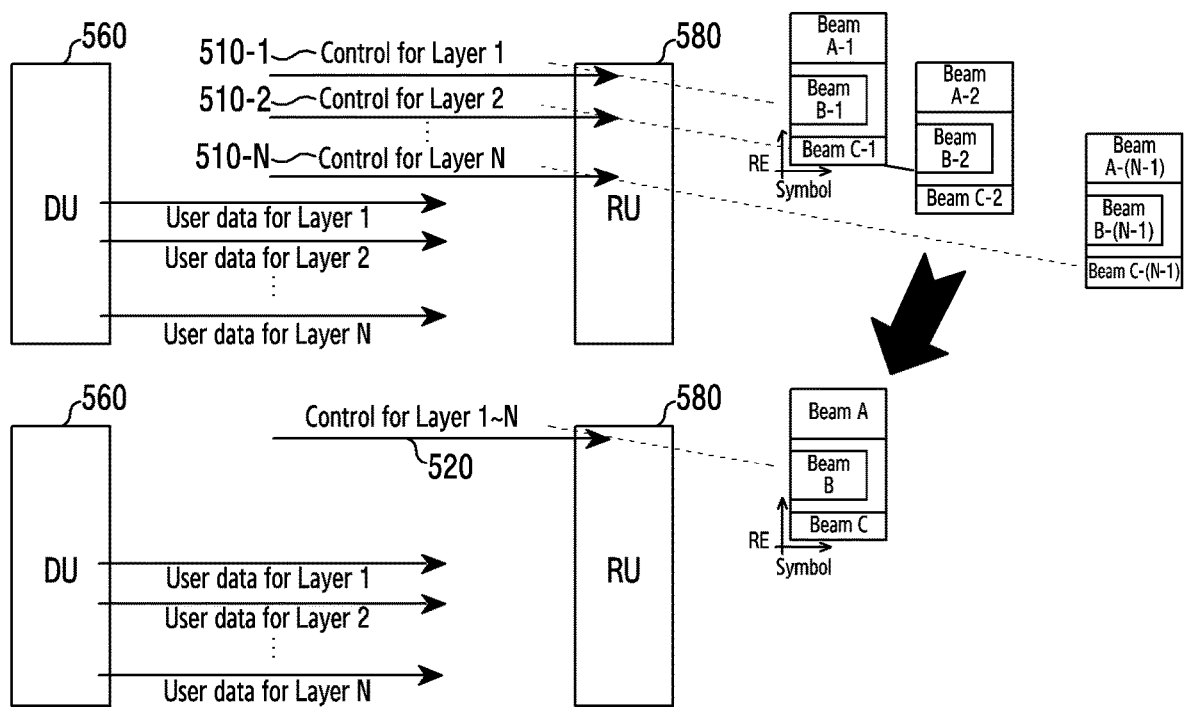
FIG. 5 illustrates an example of a control message for multi-layer scheduling according to an embodiment of the disclosure.

FIG. 5 illustrates an example of a control message for multi-layer scheduling according to an embodiment of the disclosure. In a case of a DL, a DU may transfer, to an RU, whether a resource is scheduled (e.g., a pattern on RE mapping), beam information to be applied to a scheduled resource, and user data. In a case of a UL, the DU may transmit, like in the case of DL, whether scheduling is performed and beam information for the scheduling resource to the RU, and the RU may transfer user data to the DU. In order to reduce the burden of a fronthaul between the DU and the RU, a small capacity, fewer resources, and a flexible interface between the DU and the RU are required.

Referring to FIG. 5, a situation in which a base station transmits data streams having N (N is an integer greater than 1) layers to a terminal is described. A DU 560 may transmit N data streams to an RU 580. The DU 560 may also transmit control information corresponding to each data stream to the RU 580.

User data between the DU 560 and the RU 580 is classified in units of layers, and therefore a transmission path/or a reception path may be distinguished between layers. Classification by layer may provide ease of transmission and queue management, by processing transmission and reception of user data streams in parallel. As the number of layers increases, the amount of control information for management of the layers also inevitably increases. Assume a situation in which a control message is configured for each of N pieces of user data. The DU 560 may transmit a total of N control messages (a first control message 510-1, a second control message 510-2, . . . , an N-th control message 510-N) to the RU 580. The RU 580 is required to process individual control messages to process user data corresponding to each layer. This increase in the number of layers may cause an increase in memory and processing costs for control message processing in the RU. Information commonly applied to each user data, in information included in the control messages, is received and processed in duplicate by the RU, and therefore an overhead may occur.

If a common beam is applied to all layers, a method of transmitting a control message via an integrated extended antenna-carrier (eAxC) may be considered. However, in this case, as in a case where the RU 580 does not have a precoding capability (e.g., the third function split 420a of FIG. 4), there is a difficulty in that operations are limitedly performed. When designing a control message in consideration of the capability of the RU 580 and a type of the function split, it is possible to influence a DU configuration, and therefore a design of the control message, which is to integrate and transmit scheduling patterns for multiple layers into one control message, is required.

In order to address the above-described problem, various embodiments describe a method for a DU to transfer, to an RU, a simplified control message for multiple layers when scheduling for multiple layers is performed. The DU 560 may transmit, to the RU 580, one control message 520 for multiple pieces of user data N according to multi-layer transmission. This control message may be in the form in which N control messages (the first control message 510-1, the second control message 510-2, . . . , the N-th control message 510-N) that are individually transmitted are integrated. The DU 560 may generate the control message including control information commonly applied to layers (user data) and control information applied to each layer. According to an embodiment, if there is no control parameter applied differently to each layer, control information applied to each layer may be omitted in the control message. According to an embodiment, if the control information applied in common to some layers (two or more layers) among all layers, the control message may include the control information for those layers. The control message may be referred to as a compact control message, a simplified control message, a representative control message, an integrated control message, a multi-layer-based control message, or the like.

By designing the control message so as to reduce repetitive overhead and reduce processing load and memory requirements, a fronthaul transmission capacity may be reduced. Not only when a common beam is applied to all layers, but also when a beam is allocated for each user (single user MIMO (SU-MIMO) case) and when spatially separated precoding is applied to each user (e.g., multi user MIMO (MU-MIMO) case), fewer resources may be required for information processing in the fronthaul, by defining a relatively compact control message.

Design for Fronthaul Control Message

Figure 6:
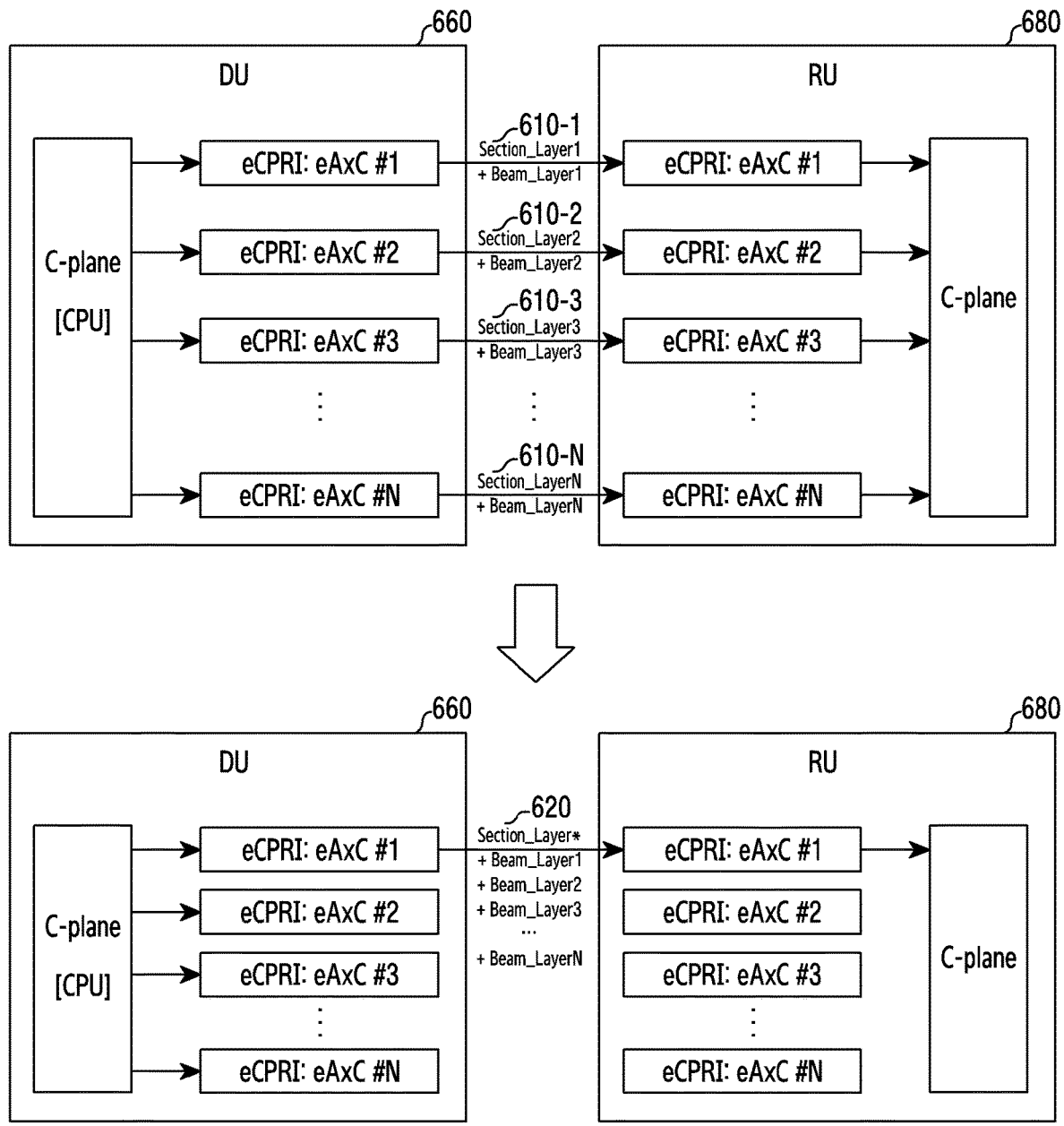
FIG. 6 illustrates an example of the DU and the RU for multi-layer scheduling according to an embodiment of the disclosure.

FIG. 6 illustrates an example of the DU and the RU for multi-layer scheduling according to an embodiment of the disclosure.

Referring to FIG. 6, eCPRI and O-RAN standards are exemplarily described as fronthaul interfaces when a message is transmitted between a DU and an RU. An eCPRI header, an O-RAN header, and an additional field may be included in an Ethernet payload of a message. Hereinafter, various embodiments will be described using standard terms of the eCPRI or O-RAN, but other expressions having the equivalent meaning as each term may be substituted and used in the various embodiments.

For a fronthaul transport protocol, Ethernet and eCPRI, which enable easy sharing with a network, may be used. The eCPRI header and the O-RAN header may be included in the Ethernet payload. The eCPRI header may be located at the front end of the Ethernet payload. The contents of the eCPRI header are as follows.

ecpriVersion (4 bits): 0001b (fixed value)
ecpriReserved (3 bits): 0000b (fixed value)
ecpriConcatenation (1 bit): 0b (fixed value)
ecpriMessage (1 byte): Message type
ecpriPayload (2 bytes): Payload size in bytes
ecpriRtcid/ecpriPcid (2 bytes): x, y, and z may be configured via a management plane (M-plane). A corresponding field may indicate a transmission path (extended antenna-carrier (eAxC) in the eCPRT) of a control message according to various embodiments during multi-layer transmission.

CU_Port_ID (x bits): A channel card is classified. Classification is possible including up to a modem (2 bits for channel card, and 2 bits for Modem).

BandSector_ID (y bits): Classification is performed according to cell/sector.

CC_ID (z bits): Classification is performed according to a component carrier.

RU_Port_ID (w bits): Classification is performed according to layer, T, antenna, etc.

ecpriSeqid (2 bytes): A sequence ID is managed for each ecpriRtcid/ecpriPcid, and a sequence ID and a subsequence ID are separately managed. Radio-transport-level fragmentation is possible if a subsequence ID is used (different from application-level fragmentation).

An application protocol of the fronthaul may include a control plane (C-plane), a user plane (U-plane), a synchronization plane (S-plane), and a management plane (M-plane).

The control plane may be configured to transmit section information and beam information via a control message. The section information is layer-specific information, and may include information relating to resources allocated in one slot (e.g., 14 symbols). In the control plane/user plane, a section may refer to an area in which resources are allocated. For example, one section may represent, in a resource grid represented by time-frequency resources, resource allocation areas for an area ranging from one RB to 273 RBs for a frequency domain and an area up to 14 symbols for a time domain. That is, the section information may include resource allocation information for communication between the RU and a terminal.

The beam information is beam information for each section/or layer, and may indicate a beam applied to a corresponding layer. The beam information is a method for indicating a beam, and may include parameters directly indicating a weight vector (or a weight matrix according to an embodiment) applied to form a beam, and may include predefined weight vectors or an indicator (e.g., a beam ID and a precoding indicator) indicating a resource to which a specific beam has been applied. In addition to information indicating which beam (which precoding) is applied, the beam information may include at least one of information indicating a type of a beam applied to layers, a user ID corresponding to a layer, or an antenna port number. The beam information is information on digital beamforming and indicates precoding. Precoding may determine how a data stream corresponding to each layer is divided and transmitted via transmission antennas. The beam information in each layer refers to an index indicating a weight vector having a size of [1×Nt], an indicator (e.g., PMI, CRI, or ii) indicating a weight matrix, or a weight vector value itself. Here, Nt is the number of antennas. Beam information in an i-th layer may correspond to an i-th column of the precoding matrix.

The user plane may include downlink data or uplink data of a user. The weight vector of the above-described beam information may be multiplied by user data (IQ data).

The management plane may be related to an initial setup, a non-realtime reset or reset, and a non-realtime report.

Referring to FIG. 6, a situation in which a DU 660 transmits a control message to an RU 680 is described. The control message may include section information and beam information for a corresponding data stream. Assume a multi-layer transmission situation. In order to transmit a total of N data streams, control information for each data stream is required to be provided to the RU 680. A processor (e.g., a CPU of the control plane) of the DU 660 may transmit a control message corresponding to each layer via an eAxC corresponding to each layer. In this case, the DU 660 may transmit a total of N control messages (a first control message 610-1, a second control message 610-2, a third control message 610-3, . . . , an N-th control message 610-N) to the RU 680. A total of N pieces of section information and a total of N pieces of beam information may be provided to the RU 680. However, information generally transmitted in multi-layer transmission is the same or similar except for beam information. Accordingly, if the RU 680 is capable of sharing information with a plurality of eAxCs, transmission of identical information may be duplicated to the RU 680, thereby acting as an overhead.

The DU 660 according to various embodiments may transmit one control message 620 for a total of N layers to the RU 680. The DU 660 may identify a transmission path for control message transmission. The RU 680 may receive the control message via the identified reception path. The transmission path (or reception path) of each layer may correspond to an extended antenna-carrier (eAxC) in the eCPRI. The eAxC may refer to an antenna-specific data flow for each carrier in a sector. That is, the eAxC may be a unit of a signal flow that may be spatially distinguished. The DU 660 may identify an eAxC for transmission of the control message. A representative eAxC for N (N is an integer greater than or equal to 1) eAxCs may be previously designated.

According to various embodiments, a representative eAxC is pre-designated for the DU and the RU via a service non-realtime OAM domain (ORAN M-plane) interface, and the DU 660 may identify the designated eAxC when multi-layer transmission is performed or when the control message is transmitted. For the management plane (M-plane), a plurality of eAxCs and one representative eAxC ID may be designated, such as "eAxC ID #A={eAxC ID #0, eAxC ID #1, eAxC ID #2, eAxC ID #(N−1)}, where A is #0-#(N−1)." In some embodiments, a representative eAxC for each group among a plurality of eAC groups may be pre-designated (e.g., each of a representative eAxC for a first group and a representative eAxC for a second group exists). In some other embodiments, one or more eAxCs for all eAxCs may be pre-designated (e.g., a set including one or more eAxCs having representativeness exists). One or more eAxCs may be prioritized. For transmission of the integrated control message, a required number of eAxCs may be used for the control message transmission in priority order.

The DU 660 according to various embodiments may generate a control message to be transmitted via an identified path (representative eAxC). The control message may be an integrated message including information on a total of N layers. By configuring the control message so that the control message does not include section information/beam information for one layer, but includes section information for multiple layers and beam information for each of the layers, an overhead in the fronthaul may be reduced. For a configuration of this control message, a new field may be added to the control message. The DU may transmit the control message on a control plane section by attaching a new extension field, a "section extension" field. According to an embodiment, the "section extension" field may be added to the control message based on ExtType=8 of the ORAN WG4 CUS standard. ExtType defines a type for section extension on the control plane (C-plane). A new type of an extension format may be defined based on ExtType=8. For example, this "section extension" field may be applied when the section type of the control message is 1, 3, or 5. A beam ID field in the control message, to which the "section extension" field is attached, may refer to a weight matrix instead of a beam weight vector based on beam group type information (beamGroupType) in the "section extension" field. According to another embodiment, the "section extension" field may be added to the control message based on ExtType=7 of the ORAN WG4 CUS standard. A new control message may be configured by modifying a part of the field according to the existing ExtType.

The extension field in the control message may further include control information for layers. For example, the extension field may be defined as shown in the following table.

TABLE 1

| 0 | 1 | 2 | 3 | 4 | 5 | 6 | 7 | | |
|---|---|---|---|---|---|---|---|---|---|
| ef | | extType = 0x08 | | | | | | 1 | Octet N |
| | | extLen = 0x01 | | | | | | 1 | Octet N + 1 |
| beamGroupType | | | reserved | | | | | 1 | Octet N + 2 |
| | | | reserved | | | | | 1 | Octet N + 3 |

The "ef" may indicate whether a section extension exists. For example, if "ef" is 1, this may indicate the existence of the section extension field, and if "ef" is 0, this may indicate the absence of the section extension field. "ExtType" refers to a type of the extension field, and "extLen" refers to a length of the extension field in the number of bytes. According to an embodiment, a "beamGroupType" field may be added as a payload in the extension field. For example, the "beamGroupType" field is 2 bits and may be configured to indicate a scheduling scheme of beamID in the control message.

In some embodiments, the extension field in the control message may further include control information for an individual layer. For example, the extension field may be defined as shown in the following table.

TABLE 2

| 0 | 1 | 2 | 3 | 4 | 5 | 6 | 7 | | |
|---|---|---|---|---|---|---|---|---|---|
| ef | | extType = 0x08 | | | | | | 1 | Octet N |
| | | extLen = 0x03 | | | | | | 1 | Octet N + 1 |
| beamGroupType | | | numPortc = 0 × 03 | | | | | 1 | Octet N + 2 |
| bif = 1b | 2st port beamID[14:8] (or ueID[14:8]) | | | | | | | var | Octet N + 3 |
| 2st port beamID[7:0] (or ueID[7:0]) | | | | | | | | var | Octet N + 4 |
| bif = 1b | 3nd port beamID[14:8] (or ueID[14:8]) | | | | | | | var | Octet N + 5 |
| 3nd port beamID[7:0] (or ueID[7:0]) | | | | | | | | var | Octet N + 6 |
| bif = 1b | 4rd port beamID[14:8] (or ueID[14:8]) | | | | | | | var | Octet N + 7 |
| 4rd port beamID[7:0] (or ueID[7:0]) | | | | | | | | var | Octet N + 8 |
| bif = 0b | | reserved | | | | | | var | Octet N + 9 |
| | | reserved | | | | | | var | Octet N + 10 |
| | | reserved | | | | | | var | Octet N + 11 |

The "bif (beam identification field)" is an indicator indicating the existence of a beam ID of a subsequent Octet, and an x-th port beamID represents beam information for an individual layer. The beamID of a 1st port may be included in an O-RAN header in the control message. In some cases, the 'bif' field may be omitted. A "beamGroupType" field is 2 bits and may be configured to indicate a scheduling scheme for layers in the control message. For example, the "beamGroupType" field may be configured as shown in the following table.

TABLE 3

| beamGroupType | Scheduling Case | Description |
|---|---|---|
| 00b | Common beam | beamID in the section is used as a common beam ID for the "numPortc" ports in front among the ports grouped by M-plane. In this case, extLen = 0x01. This type is not used for Section type 5 |
| 01b | Single User | The consecutive "numPortc" beamIDs subsequent to the beamID in the section apply to the "numPortc" ports. In this case, extLen = 0x01. This type is not used for Section type 5. The beamIDs comprising a beam matrix should be stored at RU. '01b' indicates beam matrix indication. |
| 10b | Multi-User | beamIDs listed in the section extension apply to the "numPortc" ports. BeamID. "numPortc" beam ID or ueID should be included. '10b' indicates beam vector listing. |
| 11b | N/A | reserved |

The "numPortc" may indicate the number of ports (or the number of layers or the number of transmission/reception (Tx/Rx) paths) indicated by the extension field. According to the standard, 64 ports may be indicated. The "bif" may be an indicator indicating the existence of a beam ID of a subsequent Octet. In some cases, the 'bif' field may be omitted. A single user and multiple users are distinguished according to whether overlap occurs during scheduling in a designated frequency domain (e.g., one or more RBs). For example, resource allocation within the same RB range may correspond to a multi-user schedule.

The extension fields and individual structures in Tables 1 to 3 can be modified in a manner that is obvious to those skilled in the art.

Figure 7:
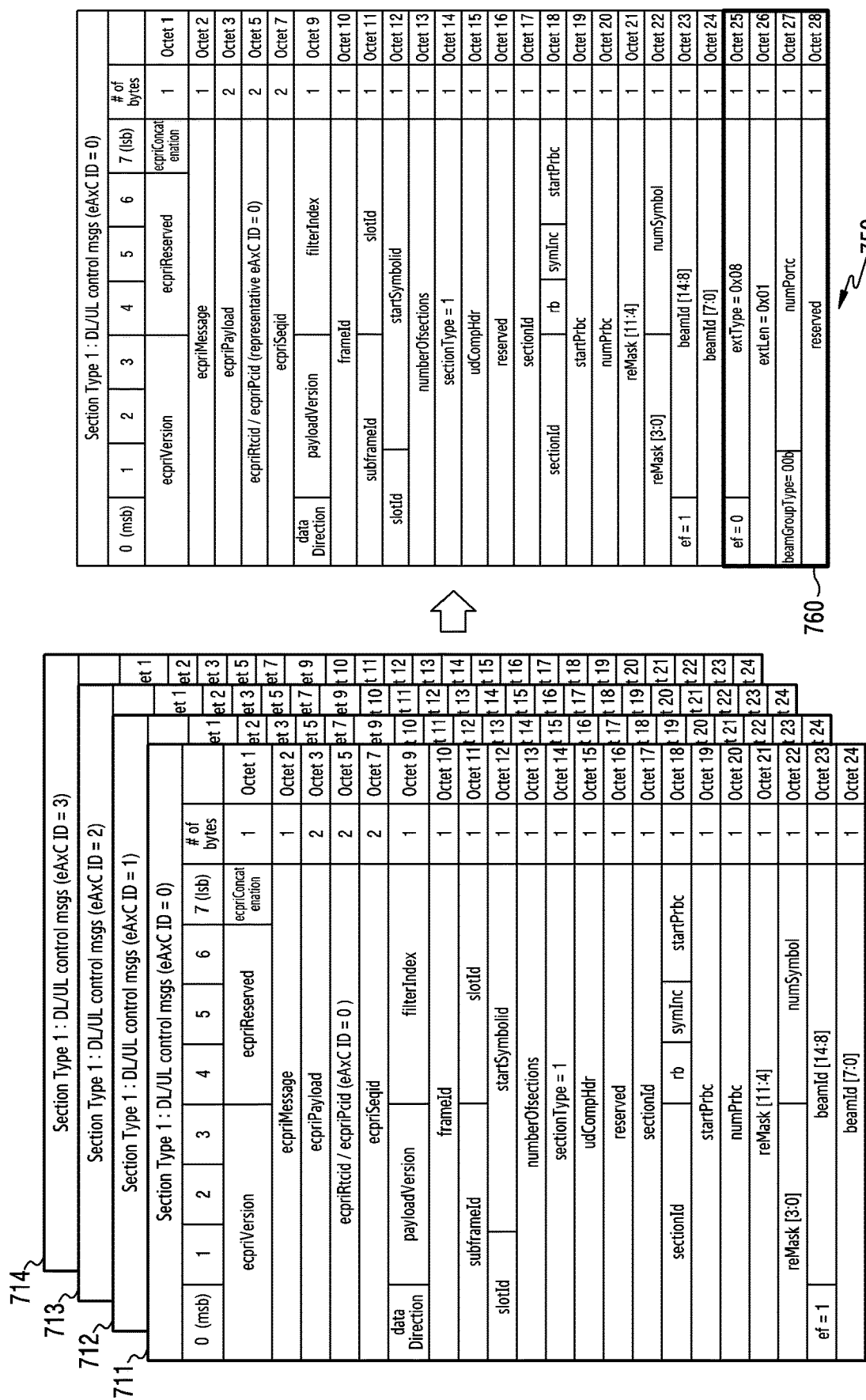
FIG. 7 illustrates an example of a structure of a control message according to an embodiment of the disclosure.

FIG. 7 illustrates an example of a structure of a control message according to an embodiment of the disclosure. A multi-layer transmission situation for four streams is described as an example.

Referring to FIG. 7, a control message set 700 includes layer-specific control messages 711, 712, 713, and 714 without an extension field according to various embodiments. Octet 1 to octet 7 of a control message may correspond to an eCPRI header. Except for ecpriRtcid/ecpriPcid indicating a transmission path (eAxC) within the eCPRI header, other parameters may be common to layers. Octet 9 to octet 24 of the control message may correspond to the eCPRI header. In some embodiments, parameters of an O-RAN header may be common to layers. In some embodiments, some of parameters of the O-RAN header may be common to layers, and some parameters, such as beamID, may be configured differently for each layer. When the layer-specific control messages 711, 712, 713, and 714 are transmitted, information commonly applied to each layer is received and processed in duplicate by an RU, so an overhead may occur.

In order to address the above-described problem, a DU may transmit a control message 750 to the RU. The control message 750 may be in the form in which the control messages 711, 712, 713, and 714 are integrated. According to an embodiment, the control messages 711, 712, 713, and 714 may have common parameters in another header, except for ecpriRtcid/ecpriPcid. Accordingly, the control message 750 may be configured via the existing eCPRI header and O-RAN header. Octets 1 to 4 and 6 to 24 of the control message 750 may be the same as those of the individual control messages 711, 712, 713 and 714, except for the ecpriRtcid/ecpriPcid of Octet 5. Octet 5 may be configured to indicate an ID of an eAxC designated as a representative (e.g., eAxC ID=0). When multi-layer transmission is performed, the DU may configure the control message 750 based on the representative eAxC and header parameters at the time of transmitting an individual layer.

The control message 750 may include an extension field 760 according to various embodiments. According to an embodiment, when all control parameters are commonly applied to layers, an extension field 760 may be configured as shown in Table 1. The extension field 760 of Table 1 may be added to Octets 25 to 28. The "beamGroupType" may indicate 00b. A weight vector indicated by "beamID" of octets 23 and 24 may be commonly applied to layers. Further, "numPortc" is the number of ports for multi-layer transmission and may indicate 4.

FIG. 7 illustrates an embodiment in which an extension field is added to the control message according to Table 1, but embodiments of the disclosure are not limited thereto. Other types of extension fields may be defined. According to an embodiment, an extension field may be configured as shown in Table 2.

According to an embodiment, the extension field 760 may include a beam group indicator. The weight vector (or weight matrix) applied during signal transmission may be configured by two stages. A beam group may be indicated in stage 1, and a beam within the beam group may be indicated in stage 2. The extension field 760 may include a beam group indicator. A beam ID in a header may be configured to indicate a beam in the beam group. If the beam group indicator does not need to be changed, the beam group indicator may be intermittently omitted in the extension field 760. By indicating a group and indicating an individual beam in the group, the number of bits occupied by beam IDs for layers may be decreased. This is because the beam group of each of layers is the same, but the individual beams may be different. Beam ID information in an existing section may be recycled by reducing the amount of beam ID via stage 2 indication. According to an additional embodiment, in a case of MU-MIMO, the extension field 760 may further include an individual beam ID for each of the layers from a second layer (after the first layer). The beam ID in the extension field 760 may also be configured to indicate a beam in the beam group.

According to an embodiment, the extension field 760 may include a group identifier. The group identifier may indicate a group to which a layer belongs. The group may represent a group to which an identical weight matrix is applied. For example, the group identifier may be configured in the form of a bitmap according to the sizes of layers. "0" may indicate a first group, and "1" may indicate a second group. The bitmap may indicate scheduling via MU-MIMO. If all bitmaps are 0, the group identifier may indicate scheduling via a common beam. If all bitmaps are 1, the group identifier may indicate scheduling via SU-MIMO. For another example, the group identifier may be configured by a layer classifier. For example, if a control message for a total of four layers is configured, a value of "0" may indicate scheduling via a common beam, a value of "1" may indicate MU-MIMO scheduling according to two layers for each terminal, and a value of "4" may indicate single user scheduling.

Figure 8:
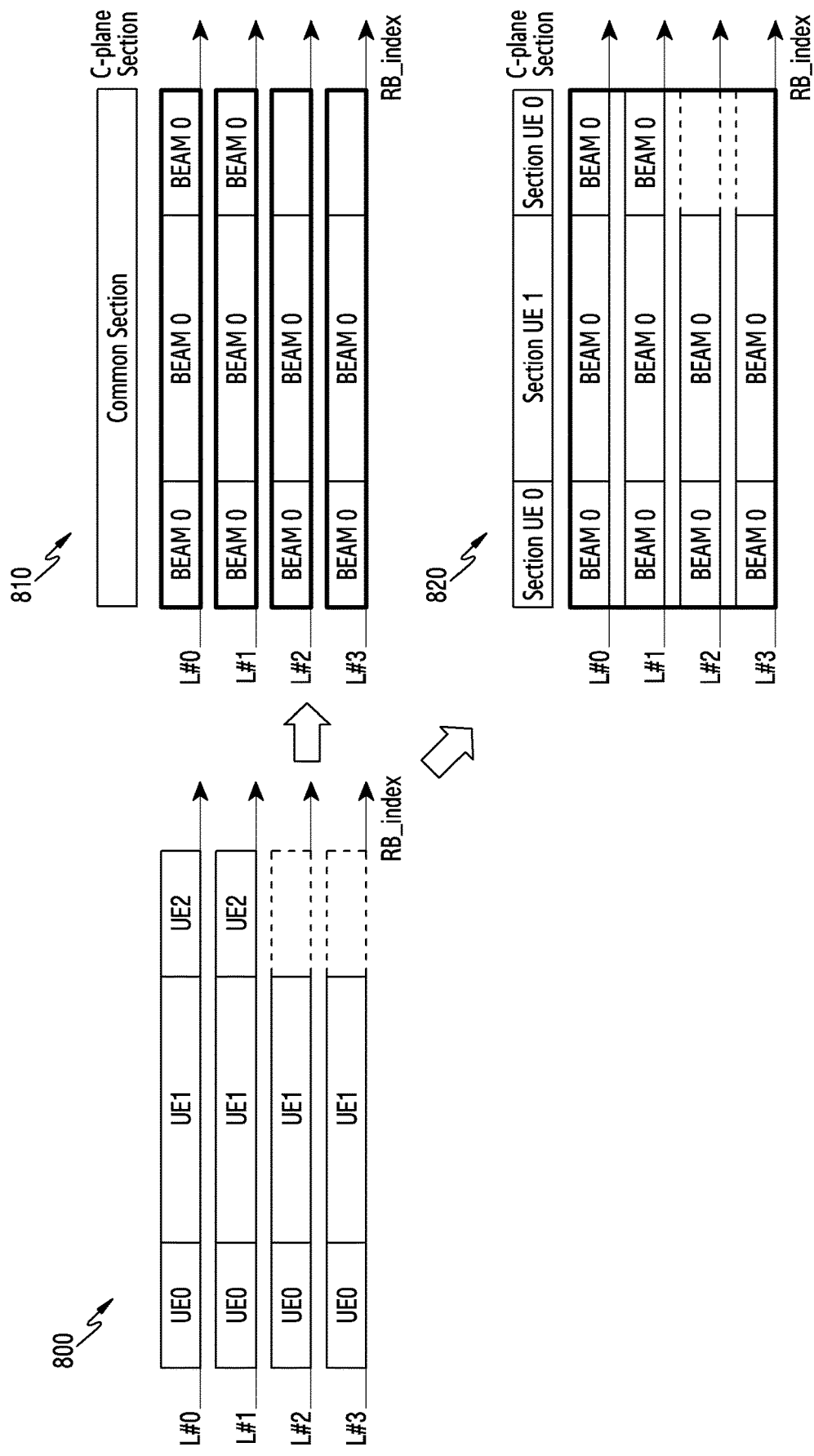
FIG. 8 illustrates an example of control message transmission according to an embodiment of the disclosure.

FIG. 8 illustrates an example of control message transmission according to an embodiment of the disclosure. A situation, in which resource allocation for four layers of a single user is performed, is illustrated. A DU may generate a control message indicating resource allocation and beam information for each terminal according to a scheduling result. The horizontal axis represents a frequency domain and the vertical axis represents a layer.

Referring to FIG. 8, resources for UE #0 are allocated in a first frequency domain over layer #0 to layer #3, resources for UE #1 are allocated in a second frequency domain over layer #0 to layer #3, and resources for UE #2 are allocated in a third frequency domain over layer #0 to layer #3 (800). Referring to a control plane 810, a total of 4 individual control messages are transmitted. Since the number of ranks of UE #0 is 4, the number of ranks of UE #1 is 4, and the number of ranks of UE #2 is 2, the maximum number of ranks of UE #0, UE #1 and UE #2 is 4. A control message should be transmitted for each layer, and the maximum rank between terminals, on which scheduling is performed, is 4, so that a total of 4 control messages may be required. Although an identical beam (beam #0) is provided to layers and terminals, it is inefficient to transmit four control messages on the control plane, and therefore one integrated control message may be proposed.

Referring to a control plane 820, one integrated control message is transmitted. In order to configure the control message, the parameters in Table 1 may be configured as follows.

Section Configuration: An eCPRI header and an O-RAN header may be used.

eAxC ID=#0 (representative): A designated path among multiple layers is indicated. A representative designated path is indicated. #0 is merely exemplary, and according to an embodiment, it is also possible to map an arbitrary eAxC ID (e.g., #0, #1, . . . , #N−1) as a representative.

Beam ID=#0 (common beam): A beam commonly applied to all terminals is indicated.

Section Extension Configuration beamGroupType=00b: A beam scheduling scheme according to Table 3 is indicated.

numPortc=4: A total number of layers is 4. According to an embodiment, if the beam scheduling scheme is 00b, the number of layers may be omitted.

Figure 9:
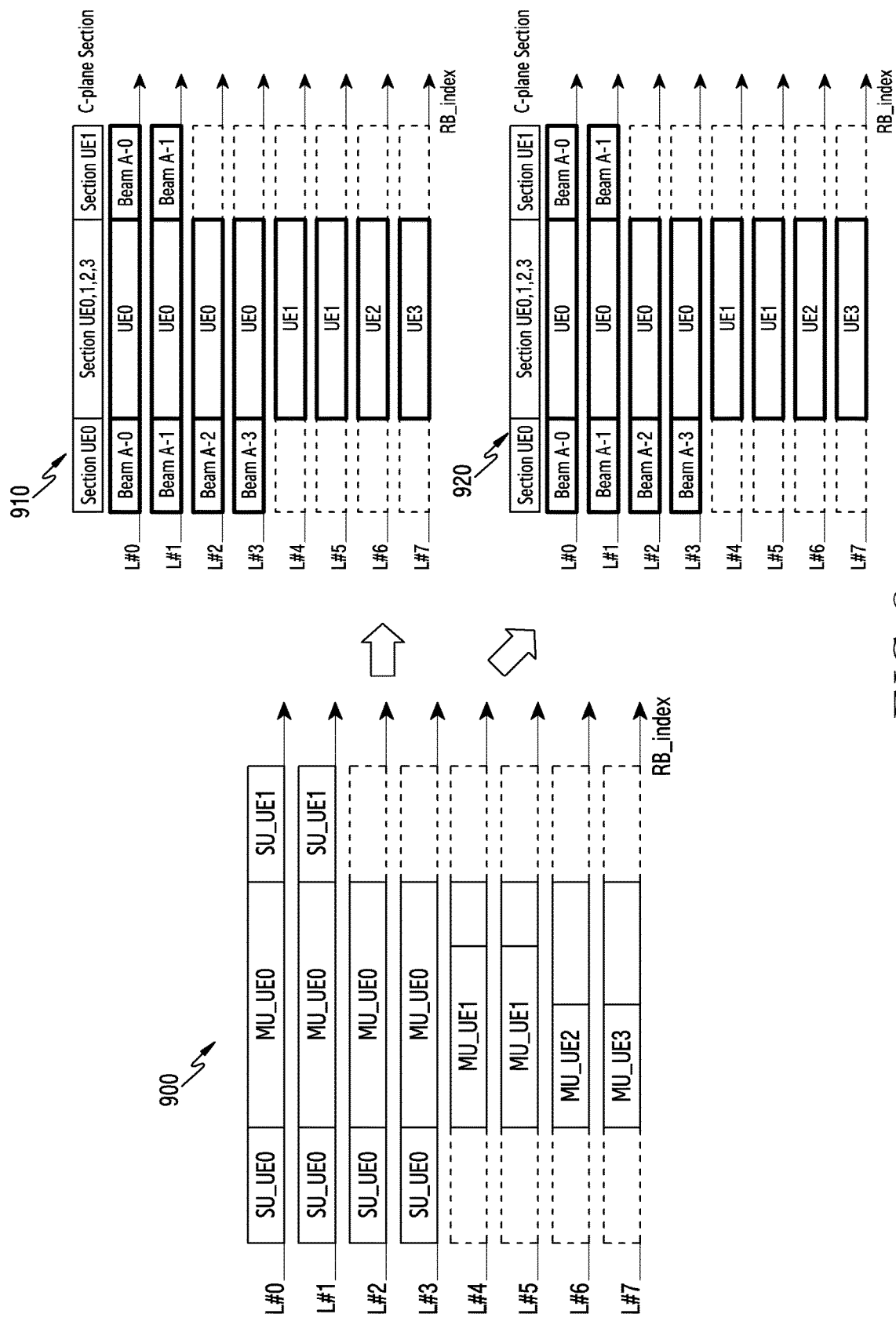
FIG. 9 illustrates another example of control message transmission according to an embodiment of the disclosure.

FIG. 9 illustrates another example of control message transmission according to an embodiment of the disclosure. A situation, in which resource allocation for up to a total of eight layers is performed in a situation where single-user scheduling and multi-user scheduling are mixed, is illustrated. A DU may generate a control message indicating resource allocation and beam information for each terminal according to a scheduling result. The horizontal axis represents a frequency domain and the vertical axis represents a layer.

Referring to FIG. 9, resources for UE #0 are allocated in a first frequency domain over layer #0 to layer #3, resources for UE #0, UE #1, UE #2, and UE #3 are allocated in a second frequency domain over layer #0 to layer #7, and resources for UE #1 are allocated in a third frequency domain over layer #0 and layer #1 (900). Referring to a control plane 910, a total of 14 individual control messages are transmitted. The number of ranks of UE #0 is 4, the number of ranks of UE #1 is 2, the number of ranks in a second resource area is 8, and therefore layers requiring full scheduling may be classified to be 14. A control message should be transmitted for each layer, and thus a total of 14 control messages may be required. Although scheduling for SU-MIMO is performed in a first and a third resource area and scheduling for MU-MIMO is performed in a second resource area, fronthaul resources may be wasted due to configuration of the control message for each layer. Therefore, one integrated control message may be proposed for each scheduling scheme.

Referring to a control plane 920, a total of three integrated control messages are transmitted. One integrated control message is transmitted for each frequency domain. In order to configure the control message, the parameters in Table 1 or Table 2 may be configured as follows.

Section Configuration: An eCPRI header and an O-RAN header may be used.

eAxC ID=#0 (representative): A designated path among multiple layers is indicated. A representative designated path is indicated. #0 is merely exemplary, and according to an embodiment, it is also possible to map an arbitrary eAxC ID (e.g., #0, #1, . . . , #N−1) as a representative.

Beam ID=#0: A beam for layers of a single terminal or a beam applied to a first layer is indicated.

First Section Extension Configuration—a first resource area beamGroupType=01b: A beam scheduling scheme according to Table 3 is indicated.

numPortc=4: A total number of layers is 4.

Second Section Extension Configuration—a second resource area beamGroupType=10b: A beam scheduling scheme according to Table 3 is indicated.

numPortc=8: A total number of layers is 8.

beamID #1-#7 (or UE IE #1-#7): A beamID for each layer is defined. A beam ID for the first layer may be included in a section configuration. It has been described that a beamID is configured for each layer. However, according to an embodiment, a reduced number of beam IDs may be included according to the size of a beam matrix.

Third Section Extension Configuration—a third resource area beamGroupType=01b: A beam scheduling scheme according to Table 3 is indicated.

numPortc=2: A total number of layers is 2.

Figure 10A:
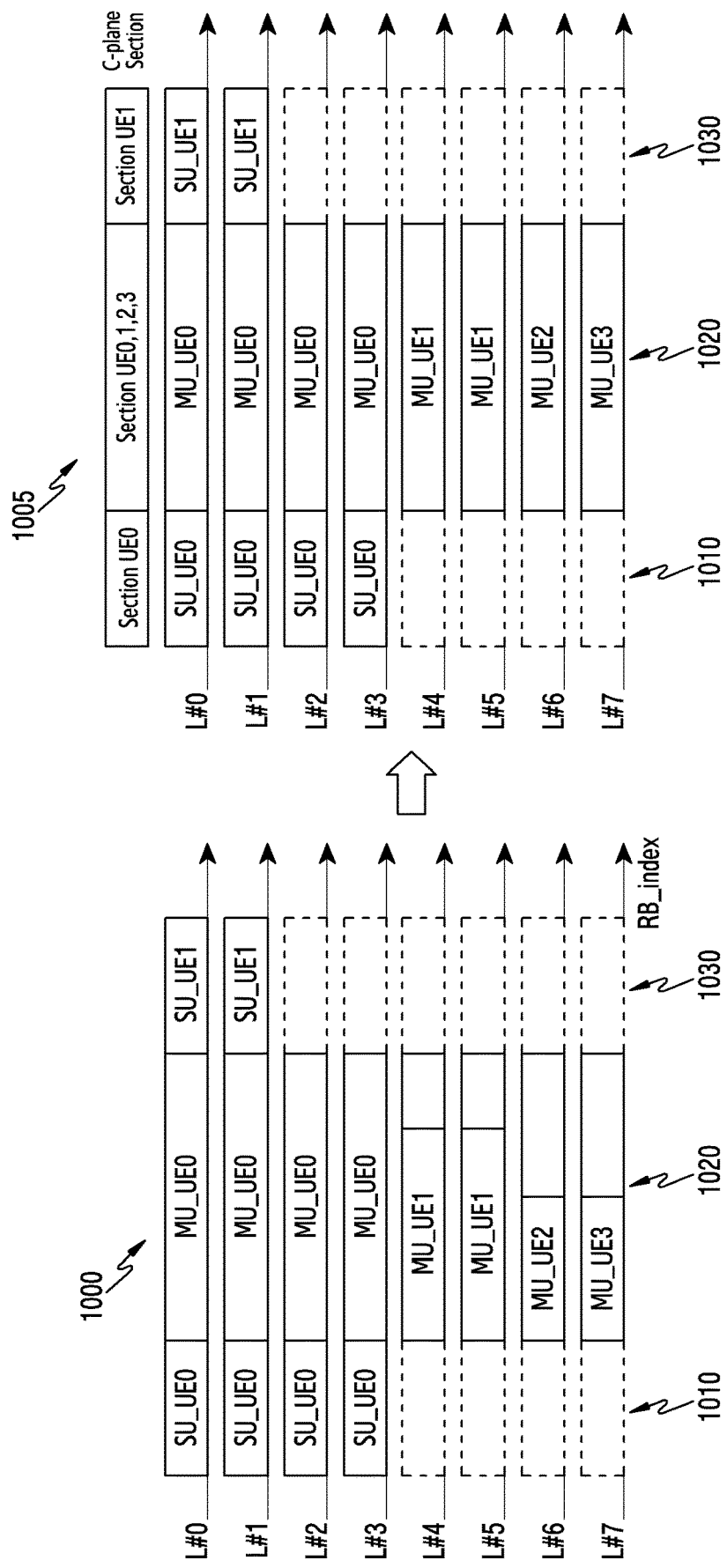
FIG. 10A illustrates an example of a control plane during multi-layer scheduling according to an embodiment of the disclosure.

FIG. 10A illustrates an example of a control plane during multi-layer scheduling according to an embodiment of the disclosure. A situation, in which resource allocation is performed in a situation where single-user scheduling and multi-user scheduling are mixed, is illustrated. A DU may generate a control message indicating resource allocation and beam information for each terminal according to a scheduling result. The horizontal axis represents a frequency domain and the vertical axis represents a layer.

Referring to FIG. 10A, resources for UE #0 are allocated in a first frequency domain 1010 over layer #0 to layer #3, resources for UE #0, UE #1, UE #2, and UE #3 are allocated in a second frequency domain 1020 over layer #0 to layer #7, and resources for UE #1 are allocated in a third frequency domain 1030 over layer #0 and layer #1 (1000). When scheduling for multiple users is performed in the second frequency domain 1020, any beam may be allocated to an area without user data, that is, an area in which all user IQ data is 0. Accordingly, not all UE #1, UE #2, and UE #3 use the second frequency domain 1020 in layer #4 to layer #7, but for ease of configuration of the control message, a beam allocated to a scheduled resource of the second frequency domain 1020 may be also equally allocated to an unscheduled resource (1005).

Figure 10B:
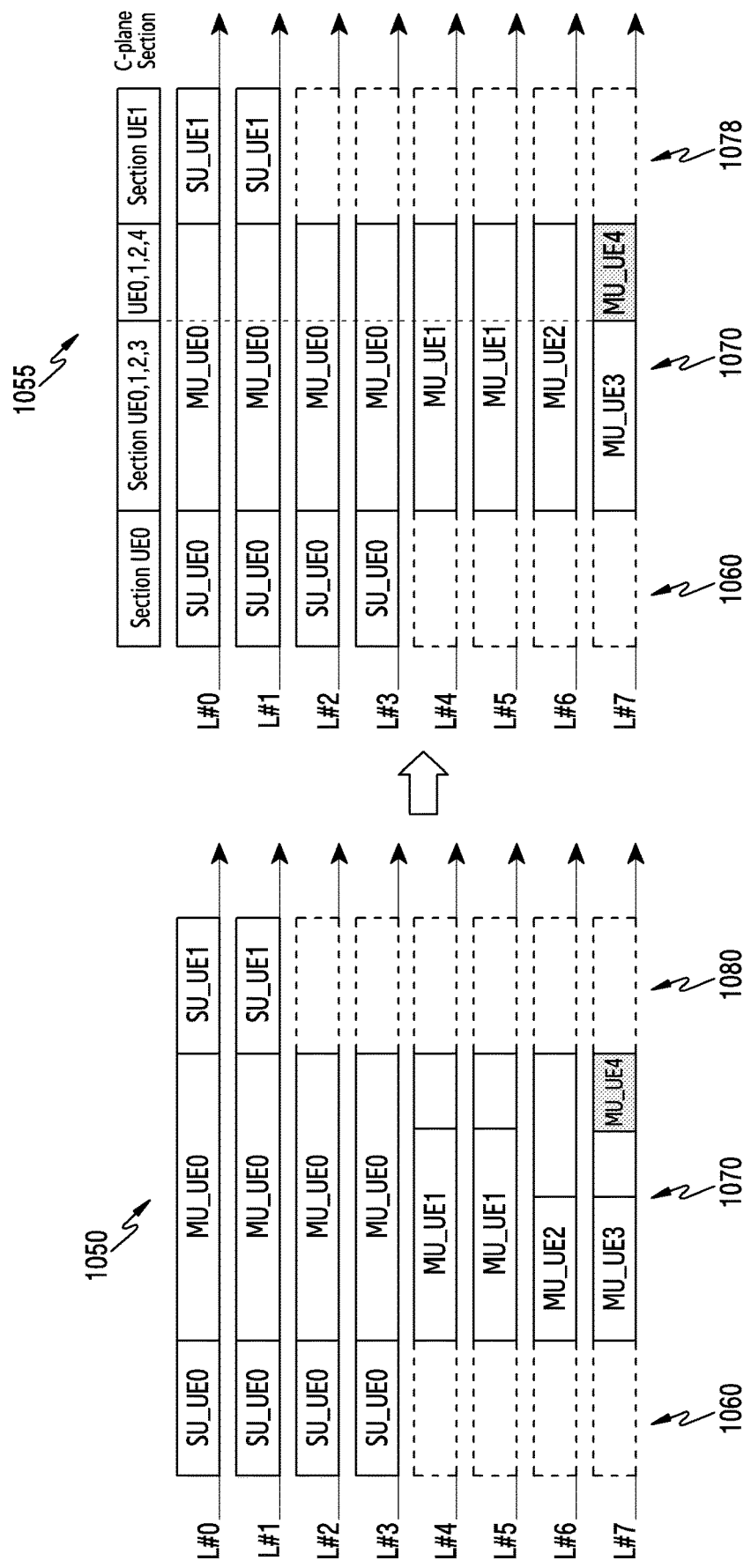
FIG. 10B illustrates another example of a control plane during multi-layer scheduling according to an embodiment of the disclosure.

FIG. 10B illustrates another example of a control plane during multi-layer scheduling according to an embodiment of the disclosure. A situation, in which resource allocation is performed in a situation where single-user scheduling and multi-user scheduling are mixed, is illustrated. A DU may generate a control message indicating resource allocation and beam information for each terminal according to a scheduling result. The horizontal axis represents a frequency domain and the vertical axis represents a layer.

Referring to FIG. 10B, resources for UE #0 are allocated in a first frequency domain 1060 over layer #0 to layer #3, resources for UE #0, UE #1, UE #2, UE #3, and UE #4 are allocated in a second frequency domain 1070 over layer #0 to layer #7, and resources for UE #1 are allocated in a third frequency domain 1080 over layer #0 and layer #1 (1050).

When scheduling for multiple users is performed in the second frequency domain 1070, any beam may be allocated to an area without user data, that is, an area in which all user IQ data is 0. Not all UE #1, UE #2, UE #3, and UE #4 use the second frequency domain 1070 in layer #4 to layer #7, but for ease of configuration of the control message, a beam allocated to a scheduled resource of the second frequency domain 1070 may be also equally allocated to an unscheduled resource. However, unlike FIG. 10A, in layer #7 of FIG. 10B, not only UE #3 but also UE #4 are scheduled in the second frequency domain 1070 (1055). UE multiplexing is required for a layer of a resource area for MU-MIMO, and thus section fragmentation may be required. According to an embodiment, an RU may fragment a section for a specific layer. The RU may configure a control message to include information on the section fragmentation. For example, an extension field may include information (e.g., port number indication) on a layer to be fragmented. The extension field may include location information (e.g., RB offset) of an RB required to be fragmented.

Figure 11:
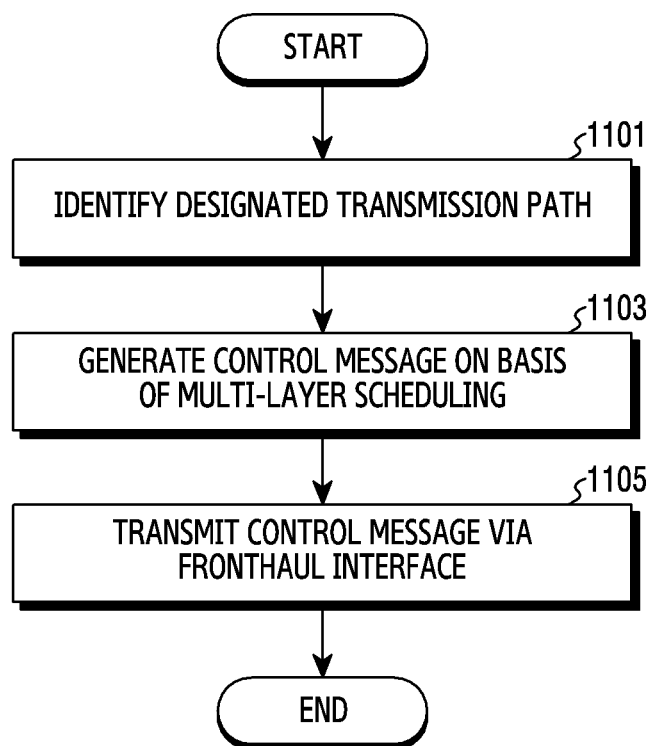
FIG. 11 illustrates an operation flow of the DU, for multi-layer scheduling according to an embodiment of the disclosure.

FIG. 11 illustrates an operation flow of the DU, for multi-layer scheduling according to an embodiment of the disclosure. A DU illustrates the DU 160 of FIG. 2.

Referring to FIG. 11, in operation 1101, a DU may identify a designated transmission path. The DU may identify one or more transmission paths among a plurality of layers. The identified path may be a path designated to represent the plurality of layers. According to an embodiment, designation of the transmission path may be performed in a management plane (M-plane of O-RAN). For the management plane (M-plane), "eAxC ID #A={eAxC ID #0, eAxC ID #1, eAxC ID #2, eAxC ID #(N−1)} (A is one of #0 to #N−1)" may be designated. A representative eAxCs for a total of N layers may be designated.

In operation 1103, the DU may generate a control message based on multi-layer scheduling. Multi-layer scheduling refers to a procedure of allocating resources for a plurality of streams. A stream may correspond to a port (e.g., an antenna port) of an RU. A scheduler of a base station may perform resource allocation for the plurality of streams within a designated time-frequency domain (e.g., section). The DU may generate the control message according to a result of the scheduling.

The DU may generate the control message including section information, beam information, and flow information. The DU may generate section information according to the scheduling result. For example, the section information may include information (e.g., frame, subframe, slot, and symbol) on the time domain, information on the frequency domain (e.g., RB and reMASK), and information (e.g., section ID) on the section. The DU may configure the control message to include the section information. The DU may generate beam information according to the scheduling result. Resources that are spatially distinguished may also be included in the scheduling result. For example, the DU may generate beam information so that the beam information includes at least one of a parameter (e.g., beamID) related to a beam to be allocated to each terminal, a parameter (e.g., PMI) for precoding to be applied to layers of terminals, and a parameter related to MU-MIMO scheduling. The DU may generate flow information indicating the path identified in operation 1101. For example, for the corresponding information, a value may be configured so that an "ecpriRtcid/ecpriPcid" field in an eCPRI header indicates an eAxC ID corresponding to the identified path, and the flow information is generated so as to include the configured value.

In operation 1105, the DU may transmit the control message via a fronthaul interface. For example, the DU may transmit the control message based on at least one interface among an eCPRI and an O-RAN in fronthaul interfaces. For example, the DU may use the header of the O-RAN to transfer the section information. The DU may use a section extension field of the O-RAN to transfer the beam information. The DU may use the "ecpriRtcid/ecpriPcid" field in the eCPRI header in order to transfer the flow information.

Figure 12:
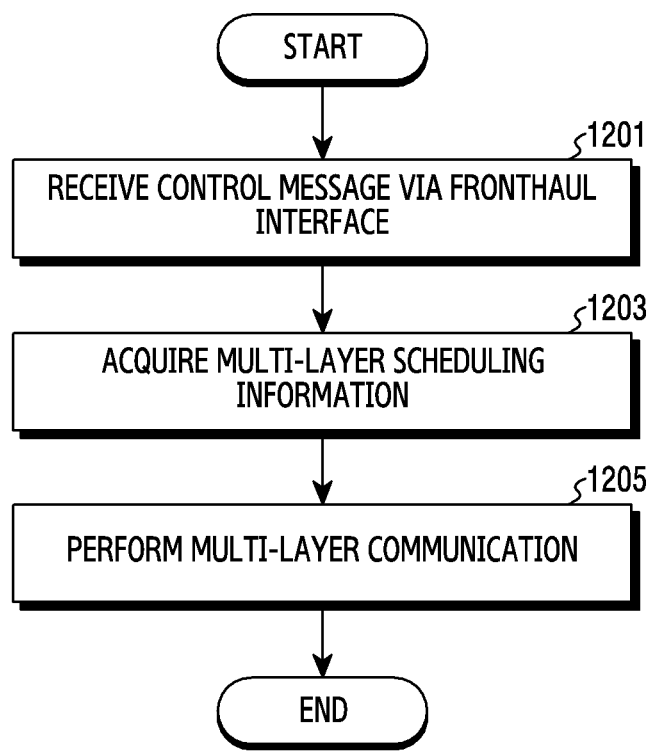
FIG. 12 illustrates an operation flow of the RU, for multi-layer scheduling according to an embodiment of the disclosure.

FIG. 12 illustrates an operation flow of an RU, for multi-layer scheduling according to an embodiment of the disclosure. An RU illustrates the RU 180 of FIG. 3.

Referring to FIG. 12, in operation 1201, the RU may receive a control message via a fronthaul interface. For example, the RU may transmit the control message based on at least one interface among an eCPRI and an O-RAN in fronthaul interfaces. The RU may receive the control message based on at least one of header information of an eCPRI and header information of an O-RAN. The control message may include multi-layer scheduling information.

In operation 1203, the RU may obtain multi-layer scheduling information. The multi-layer scheduling information may include section information, beam information, and flow information for a plurality of layers. For example, the RU may acquire multi-layer scheduling information based on at least one interface among the eCPRI and O-RAN in fronthaul interfaces. For example, the RU may identify a header of the O-RAN to receive the section information. The RU may obtain time-frequency resources for wireless communication from the section information. The RU may identify a section extension field of the O-RAN to receive the beam information. The RU may obtain a weight vector to be applied to each layer, from the beam information. The weight vector may be a beam weight vector based on a common beam or a weight vector corresponding to one column of a precoding matrix. The RU may identify an "ecpriRtcid/ecpriPcid" field in the eCPRT header to receive the flow information. The RU may identify a transmission path of the corresponding control message from the flow information.

In operation 1205, the RU may perform multi-layer communication. The RU may transmit scheduling information to a terminal and may perform downlink communication for performing multi-layer transmission. The RU may transmit data streams to the terminal by applying a weight matrix according to the scheduling information. Alternatively, the RU may transmit the scheduling information to the terminal, and may perform uplink communication for receiving multi-layer transmission from the terminal. The RU may provide the terminal with information on the weight matrix according to the scheduling information.

According to various embodiments, by configuring a simplified control message for multiple layers and transmitting the control message via a designated path, resources consumed in a fronthaul interface between a DU and an RU may be reduced. For example, a processing load is reduced. A load for packet generation and processing of a control plane may be reduced in proportion to the number of sections reduced compared to a bandwidth (BW) of the existing control plane. For example, a memory requirement load is reduced. Memory requirements may be reduced in proportion to the number of sections reduced compared to the bandwidth (BW) of the existing control plane. As the bandwidth in the fronthaul is reduced, consumed resources may be saved, thereby enabling efficient fronthaul operation. In particular, in an environment (e.g., FR2) where layers are increased or a plurality of antennas are used, the amount of traffic that a base station basically has to process during scheduling increases, and therefore gains due to an integrated control message operation scheme of the disclosure may be further increased. For example, performance for each NR frequency range may be derived as shown in Table 4 below. Here, an indicator for performance is the number of sections of the control plane, which are required for cell support.

TABLE 4

| NR Frequency Range | Existing value | Proposed scheme |
|---|---|---|
| FR1 (100 MHz, 8 Layer) | 952 | 133 (reduced to 14.0%) |
| FR2 (100 MHz, 4 Layer) | 224 | 77 (reduced to 34.4%) |

According to embodiments, an operation method of a digital unit (DU) of a base station in a wireless communication system comprise identifying a designated path among a plurality of paths of a fronthaul interface that connects the DU and a radio unit (RU); generating a control message for a plurality of layers; and transmitting the control message to the RU via the designated path. The control message comprises scheduling information for the plurality of layers.

In some embodiments, the plurality of layers comprise a first layer and a second layer, and the control message comprises a number of the plurality of layers, information indicating a first weight vector for the first layer, and information indicating a second weight vector for the second layer.

In some embodiments, the scheduling information comprises: section information indicating common resource allocation for the plurality of layers, beam information related to a weight matrix for the plurality of layers, and flow information indicating the designated path. The section information is included in a header of an open-radio access network (O-RAN) of the control message, the beam information is included in a section extension field of the control message, and the flow information is included in "ecpriRtcid/ecpriPcid" of an enhanced common public radio interface (eCPRI) header of the control message.

In some embodiments, the control message comprises type information indicating a scheduling scheme for the plurality of layers, and the scheduling scheme comprises one of: a first scheme of applying a common beam to each layer, a second scheme of applying a precoding matrix to the plurality of layers, or a third scheme of applying individual precoding to each of the plurality of layers.

In some embodiments, if the type information indicates the first scheme, the weight matrix indicates a beamforming weight vector for a single layer, and if the type information indicates the second scheme, the weight matrix indicates the weight matrix for the plurality of layers.

In some embodiments, when all control parameters are commonly applied to layers, the control message comprises an extension field.

In some embodiments, the extension field includes a beamGroupType, a weight vector indicated by beamID, and a number of ports numPortc for multi-layer transmission.

In some embodiments, resources are allocated for a plurality of layers of a single user, and the control message indicates resource allocation and beam information for each terminal according to a scheduling result.

In some embodiments, single-user scheduling and multi-user scheduling are mixed, and the control message indicates resource allocation and beam information for each terminal according to a scheduling result.

According to embodiments, an operation method of a radio unit (RU) of a base station in a wireless communication system, comprises: receiving a control message for a plurality of layers from a digital unit (DU) via a designated path among a plurality of paths of a fronthaul interface that connects the RU and the DU; identifying scheduling information for the plurality of layers based on the control message; and performing communication based on the scheduling information.

In some embodiments, the plurality of layers comprise a first layer and a second layer, and the control message comprises a number of the plurality of layers, information indicating a first weight vector for the first layer, and information indicating a second weight vector for the second layer.

In some embodiments, the scheduling information comprises: section information indicating common resource allocation for the plurality of layers, beam information related to a weight matrix for the plurality of layers, and flow information indicating the designated path. The section information is included in a header of an open-radio access network (O-RAN) of the control message, the beam information is included in a section extension field of the control message, and the flow information is included in "ecpriRtcid/ecpriPcid" of an enhanced common public radio interface (eCPRI) header of the control message.

In some embodiments, the control message comprises type information indicating a scheduling scheme for the plurality of layers, and the scheduling scheme comprises one of: a first scheme of applying a common beam to each layer, a second scheme of applying a precoding matrix to the plurality of layers, or a third scheme of applying individual precoding to each of the plurality of layers.

In some embodiments, if the type information indicates the first scheme, the weight matrix indicates a beamforming weight vector for a single layer, and if the type information indicates the second scheme, the weight matrix indicates the weight matrix for the plurality of layers.

According to embodiments, a device of a digital unit (DU) of a base station in a wireless communication system, the device comprises: at least one processor configured to identify a designated path among a plurality of paths of a fronthaul interface that connects the DU and a radio unit (RU), generate a control message for a plurality of layers, and control the fronthaul interface to transmit the control message to the RU via the designated path, and the control message comprises scheduling information for the plurality of layers.

In some embodiments, the plurality of layers comprise a first layer and a second layer, and the control message comprises a number of the plurality of layers, information indicating a first weight vector for the first layer, and information indicating a second weight vector for the second layer.

In some embodiments, the scheduling information comprises: section information indicating common resource allocation for the plurality of layers, beam information related to a weight matrix for the plurality of layers, and flow information indicating the designated path. The section information is included in a header of an open-radio access network (O-RAN) of the control message, the beam information is included in a section extension field of the control message, and the flow information is included in "ecpriRtcid/ecpriPcid" of an enhanced common public radio interface (eCPRI) header of the control message.

In some embodiments, the control message comprises type information indicating a scheduling scheme for the plurality of layers, and the scheduling scheme comprises one of: a first scheme of applying a common beam to each layer, a second scheme of applying a precoding matrix to the plurality of layers, or a third scheme of applying individual precoding to each of the plurality of layers.

In some embodiments, if the type information indicates the first scheme, the weight matrix indicates a beamforming weight vector for a single layer, and if the type information indicates the second scheme, the weight matrix indicates the weight matrix for the plurality of layers.

According to embodiments, a device of a radio unit (RU) of a base station in a wireless communication system, the device comprising: at least one transceiver; and at least one processor, wherein the at least one processor is configured to: control a fronthaul interface, which connects the RU and a digital unit (DU), to receive a control message for a plurality of layers from the DU via a designated path among a plurality of paths of the fronthaul interface, identify scheduling information for the plurality of layers based on the control message, and control the at least one transceiver to perform communication based on the scheduling information.

In some embodiments, the plurality of layers comprise a first layer and a second layer, and the control message comprises a number of the plurality of layers, information indicating a first weight vector for the first layer, and information indicating a second weight vector for the second layer.

In some embodiments, the scheduling information comprises: section information indicating common resource allocation for the plurality of layers, beam information related to a weight matrix for the plurality of layers, and flow information indicating the designated path. The section information is included in a header of an open-radio access network (O-RAN) of the control message, the beam information is included in a section extension field of the control message, and the flow information is included in "ecpriRtcid/ecpriPcid" of an enhanced common public radio interface (eCPRI) header of the control message.

In some embodiments, the control message comprises type information indicating a scheduling scheme for the plurality of layers, and the scheduling scheme comprises one of: a first scheme of applying a common beam to each layer, a second scheme of applying a precoding matrix to the plurality of layers, or a third scheme of applying individual precoding to each of the plurality of layers.

In some embodiments, if the type information indicates the first scheme, the weight matrix indicates a beamforming weight vector for a single layer, and if the type information indicates the second scheme, the weight matrix indicates the weight matrix for the plurality of layers.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a distributed unit (DU), the method comprising:
generating a control plane (C-plane) message for multiple ports, the C-plane message including section information and a section extension; and
transmitting the C-plane message to a radio unit (RU) via a specific port of the multiple ports,
wherein the section information includes information on a beam identifier (ID), and
wherein the section extension includes:
beam group type information for indicating a type of beam grouping, and
port information for indicating a total number of one or more extended antenna-carrier (eAxC) ports indicated by the section extension.

2. The method of claim 1,
wherein each of multiple ports corresponds to a corresponding transmission or reception (Tx/Rx) path or a corresponding layer, and
wherein the specific port is specified by a management plane (M-plane).

3. The method of claim 1, wherein each of the multiple ports are share the section information within the RU.

4. The method of claim 1, wherein the type of beam grouping is one of:
a first type for indicating that the beam ID is used as a common beam ID,
a second type for indicating that beam IDs subsequent to the beam ID apply to the one or more eAxC ports, and
a third type for indicating that beam IDs listed in the section extension apply to the one or more eAxC ports.

5. The method of claim 4, wherein the beam ID indicates a beam matrix if the type of beam grouping is the second type.

6. The method of claim 1,
wherein the beam ID is associated with an index indicating multiple beams, and
wherein each beam of multiple beams applies to a corresponding port among the specific port and the one or more eAxC ports.

7. The method of claim 1,
wherein the beam ID is associated with the specific port, and
wherein the section extension further comprises information on a beam ID or user equipment, UE, ID of each of the one or more eAxC ports.

8. A method performed by a radio unit (RU), the method comprising:
receiving, from a distributed unit (DU), a control plane (C-plane) message for multiple ports via a specific port of the multiple ports; and identifying section information and a section extension included in the C-plane message,
wherein the section information includes information on a beam identifier (ID),
wherein the section extension includes:
  beam group type information for indicating a type of beam grouping, and
  port information for indicating a total number of one or more extended antenna-carrier (eAxC) ports indicated by the section extension.

9. The method of claim 8,
wherein each of multiple ports corresponds to a corresponding transmission or reception (Tx/Rx) path or a corresponding layer, and
wherein the specific port is specified by a management plane (M-plane).

10. The method of claim 8, wherein each of the multiple ports are share the section information within the RU.

11. The method of claim 8, wherein the type of beam grouping is one of:
  a first type for indicating that the beam ID is used as a common beam ID,
  a second type for indicating that beam IDs subsequent to the beam ID apply to the one or more eAxC ports, and
  a third type for indicating that beam IDs listed in the section extension apply to the one or more eAxC ports.

12. The method of claim 11, wherein the beam ID indicates a beam matrix if the type of beam grouping is the second type.

13. The method of claim 8,
wherein the beam ID is associated with an index indicating multiple beams, and
wherein each beam of multiple beams applies to a corresponding port among the specific port and the one or more eAxC ports.

14. The method of claim 8,
wherein the beam ID is associated with the specific port, and
wherein the section extension further comprises information on a beam ID or user equipment, UE, ID of each of the one or more eAxC ports.

15. A device of a distributed unit (DU), comprising:
at least one transceiver; and
at least one processor configured to:
  generate a control plane (C-plane) message for multiple ports, the C-plane message including section information and a section extension, and
  control the at least one transceiver to transmit the C-plane message to a radio unit (RU) via a specific port of the multiple ports,
wherein the section information includes information on a beam identifier (ID), and
wherein the section extension includes:
  beam group type information for indicating a type of beam grouping, and
  port information for indicating a total number of one or more extended antenna-carrier (eAxC) ports indicated by the section extension.

16. The device of claim 15,
wherein each of multiple ports corresponds to a corresponding transmission or reception (Tx/Rx) path or a corresponding layer, and
wherein the specific port is specified by a management plane (M-plane).

17. The device of claim 15, wherein each of the multiple ports are share the section information within the RU.

18. The device of claim 15, wherein the type of beam grouping is one of:
  a first type for indicating that the beam ID is used as a common beam ID,
  a second type for indicating that beam IDs subsequent to the beam ID apply to the one or more eAxC ports, and
  a third type for indicating that beam IDs listed in the section extension apply to the one or more eAxC ports.

19. The device of claim 18, wherein the beam ID indicates a beam matrix if the type of beam grouping is the second type.

20. The device of claim 15,
wherein the beam ID is associated with the specific port, and
wherein the section extension further comprises information on a beam ID or user equipment, UE, ID of each of the one or more eAxC ports.

* * * * *